(12) United States Patent
Dar et al.

(10) Patent No.: US 11,561,700 B2
(45) Date of Patent: Jan. 24, 2023

(54) TECHNIQUES FOR WORKLOAD BALANCING

(71) Applicant: EMC IP Holding Company LLC, Hopkinton, MA (US)

(72) Inventors: Shaul Dar, Petach Tikva (IL); Gajanan S. Natu, Cary, NC (US); Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/154,191

(22) Filed: Jan. 21, 2021

(65) Prior Publication Data

US 2022/0229560 A1 Jul. 21, 2022

(51) Int. Cl.
*G06F 12/00* (2006.01)
*G06F 3/06* (2006.01)

(52) U.S. Cl.
CPC ............ *G06F 3/0613* (2013.01); *G06F 3/067* (2013.01); *G06F 3/0622* (2013.01); *G06F 3/0653* (2013.01); *G06F 3/0659* (2013.01); *G06F 3/0683* (2013.01)

(58) Field of Classification Search
CPC ...... G06F 3/0619; G06F 3/065; G06F 3/0653; G06F 3/0659
USPC ......................................................... 711/154
See application file for complete search history.

(56) References Cited

U.S. PATENT DOCUMENTS

| | | | |
|---|---|---|---|
| 6,173,306 B1* | 1/2001 | Raz ........................ | G06F 9/5083 718/105 |
| 9,047,017 B1* | 6/2015 | Dolan ................... | G06F 3/0685 |
| 9,971,548 B1* | 5/2018 | Talwar .................. | G06F 3/0613 |
| 2008/0022277 A1* | 1/2008 | Kano .................... | G06F 3/0647 718/1 |
| 2013/0211809 A1* | 8/2013 | Maruyama .......... | G06F 11/3447 703/21 |
| 2015/0324126 A1* | 11/2015 | Nakajima ............... | G06F 3/067 711/114 |

(Continued)

OTHER PUBLICATIONS

PCT Application No. PCT/US2021/029348, Filed Apr. 27, 2021, International Search Report, dated Oct. 19, 2021.

(Continued)

*Primary Examiner* — Mohamed M Gebril
(74) *Attorney, Agent, or Firm* — Muirhead and Saturnelli, LLC

(57) ABSTRACT

Load balancing may include: receiving I/O workloads of storage server entities that service I/O operations received for logical devices, wherein each logical device has an owner that is one of the storage server entities that processes I/O operations directed to the logical device; determining normalized I/O workloads corresponding to the I/O workloads of the storage server entities; determining, in accordance with utilization criteria, imbalance criteria and the normalized I/O workloads, whether to rebalance the I/O workloads of the storage server entities; and responsive to determining to rebalance the I/O workloads of the storage server entities, performing processing to alleviate a detected I/O workload imbalance between two storage server entities. The processing may include moving logical device from a first storage server entity to a second storage server entity; and transferring ownership of the logical device from the first to the second storage server entity.

16 Claims, 9 Drawing Sheets

(56) References Cited

U.S. PATENT DOCUMENTS

| | | | |
|---|---|---|---|
| 2015/0347183 A1* | 12/2015 | Borthakur | G06F 9/5088 |
| | | | 718/105 |
| 2021/0271757 A1* | 9/2021 | Horspool | G06F 21/554 |

OTHER PUBLICATIONS

Philippe Armangau, et al., U.S. Appl. No. 17/137,988, filed Dec. 30, 2020, "Techniques for Workload Balancing Using Dynamic Path State Modifications".

* cited by examiner

TECHNIQUES FOR WORKLOAD BALANCING

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing load balancing comprising: receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device; determining normalized I/O workloads corresponding to the I/O workloads of the storage server entities; determining, in accordance with utilization criteria, imbalance criteria and the normalized I/O workloads, whether to rebalance the I/O workloads of the storage server entities; and responsive to determining to rebalance the I/O workloads of the storage server entities, performing first processing to alleviate a detected I/O workload imbalance between a first of the storage server entities and a second of the storage server entities, the first processing including: moving a first of the plurality of logical devices from a first of the storage server entities to a second of the storage server entities; and transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device. The moving and transferring ownership may shift a first I/O workload of the first logical device from the first storage server entity to the second storage server entity. A load balancing technique may be used to select the first logical device and the first I/O workload to be moved from the first storage server entity to the second storage server entity. The load balancing technique may perform processing using normalized I/O workloads of the plurality of logical devices to select the first logical device for movement from the first storage server entity to the second storage server entity.

In at least one embodiment, determining whether to rebalance the I/O workloads of the storage server entities may comprise determining whether the utilization criteria and the imbalance criteria are met. The utilization criteria may specify that a utilization of at least one of the first storage server entity and the second storage server entity needs to exceed a specified threshold utilization in order to perform said first processing. The imbalance criteria may specify that a difference or gap between a first normalized I/O workload of the first storage server entity and a second normalized I/O workload of the second storage entity needs to exceed a specified threshold in order for the first storage server entity and the second storage server entities to have imbalanced workloads and in order to perform said first processing.

In at least one embodiment, determining normalized I/O workloads corresponding to the I/O workloads of the storage server entities may include determining, for each of the storage server entities, a normalized read I/O workload in normalized read units and a normalized write I/O workload in normalized write units. The normalized read I/O workload of said each storage server entity may be determined using a first normalized I/O cost for each read I/O operation, and wherein the normalized write I/O workload of said each storage server entity may be determined using a second normalized I/O cost for each write I/O operation. The first normalized cost for each read I/O operation of the normalized read I/O workload of said each storage entity may be determined as a linear combination of a cost of a single read I/O operation and a number of bytes read by said each read I/O operation. The second normalized cost for each write I/O operation of the normalized write I/O workload of said each storage entity may be determined as a linear combination of a cost of a single write I/O operation and a number of bytes written by said each write I/O operation. A first coefficient and a second coefficient may be selected in accordance with a read I/O type and a configuration of a system in which said each read I/O operation is processed, and wherein the first normalized cost for said each read I/O operation may be determined as a sum of the first coefficient and a first quantity, and wherein the first quantity may be a mathematical product of the second coefficient and the number of bytes read by said each read I/O operation. A third coefficient and a fourth coefficient may be selected in accordance with a write I/O type and the configuration of a system in which said each write I/O operation is processed. The second normalized cost for said each write I/O operation may be determined as a sum of the third coefficient and a second quantity, and wherein the second quantity may be a mathematical product of the fourth coefficient and the number of bytes written by said each write I/O operation.

In at least one embodiment, determining the normalized read I/O workload of said each storage server entity may include determining a first normalized read I/O rate for a corresponding read I/O rate for read I/O s of a first size. The first normalized read I/O rate may be determined by performing second processing comprising: selecting a coefficient in accordance with a read I/O type and a configuration of a system in which the corresponding read I/O workload associated with the normalized read I/O workload is processed; and determining the first normalized read I/O rate for the corresponding read I/O rate for read I/O s of the first size as a mathematical product of the corresponding read I/O rate and a first quantity that is raised to a power denoted by the coefficient, wherein the first quantity is determined by dividing the first size by a base size used to scale the corresponding read I/O rate. Determining the normalized write I/O workload of said each storage server entity may include determining a first normalized write I/O rate for a corresponding write I/O rate for write I/O s of a first size. The first normalized write I/O rate may be determined by performing second processing comprising: selecting a coefficient in accordance with a write I/O type and a configuration of a system in which the corresponding write I/O workload associated with the normalized write I/O workload is processed; and determining the first normalized write I/O rate for the corresponding write I/O rate for write I/O s of the first size as a mathematical product of the corresponding write I/O rate and a first quantity that is raised to a power denoted by the coefficient, wherein the first quantity is determined by dividing the first size by a base size used to scale the corresponding write I/O rate.

In at least one embodiment, the storage server entities may include at least two data storage systems configured in a cluster or federation, and wherein the first storage server entity may be a first of the at least two data storage systems and the second storage server entity may be a second of the at least two data storage systems. Moving the first logical device may include migrating or relocating the first logical device from the first data storage system to the second data storage system.

In at least one embodiment, the storage server entities may include at least two nodes included in a data storage system and wherein the first storage server entity may be a first of the at least two nodes and the second storage server entity may be a second of the at least nodes. Moving the first logical device may include dynamically changing one or more preferred paths for the first logical device from the first node to the second node. Each of the preferred paths after said moving may be from a host to a target port of the second node of the data storage system, and wherein, prior to said moving, each of the preferred paths may be from the host to another target port of the first node of the data storage system. Processing may include: sending a notification from the data storage system to the host, wherein the notification identifies a change in the one or more preferred paths for the first logical device from the first node to the second node; receiving the notification by the host; sending I/O s to the first logical device over the one or more preferred paths; and responsive to determining the one or more preferred paths are not available for I/O transmission, sending subsequent I/O s to the first logical device over one or more non-preferred paths from the host to the first node of the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
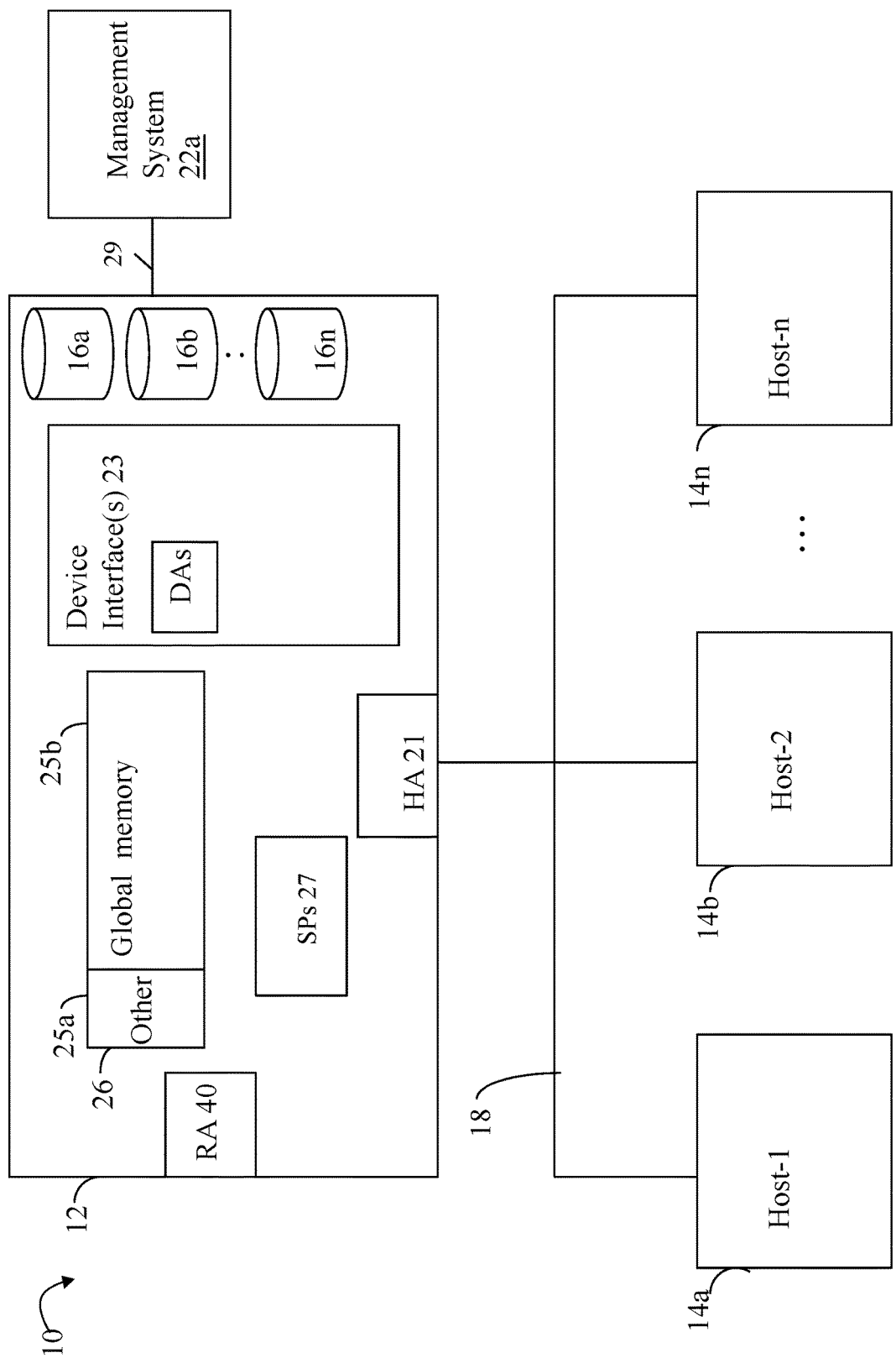
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI and Non-Volatile Memory Express (NVMe)), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network), LAN (local area network), or HCl (hyper converged infrastructure), in an embodiment using the techniques herein. An HCl in at least one embodiment may be characterized as a cluster which virtualizes both data storage and compute functions that may be managed by hosts using a platform such as vSphere® by VMware Inc. In such an embodiment, the HCl provides logical storage in the form of a data store.

It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). In some embodiments, applications on a host may execute in a virtualized environment where the applications run in the context of virtual machines (VMs) and may access data stored on virtual volumes (VVOLS) on the data storage system.

A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
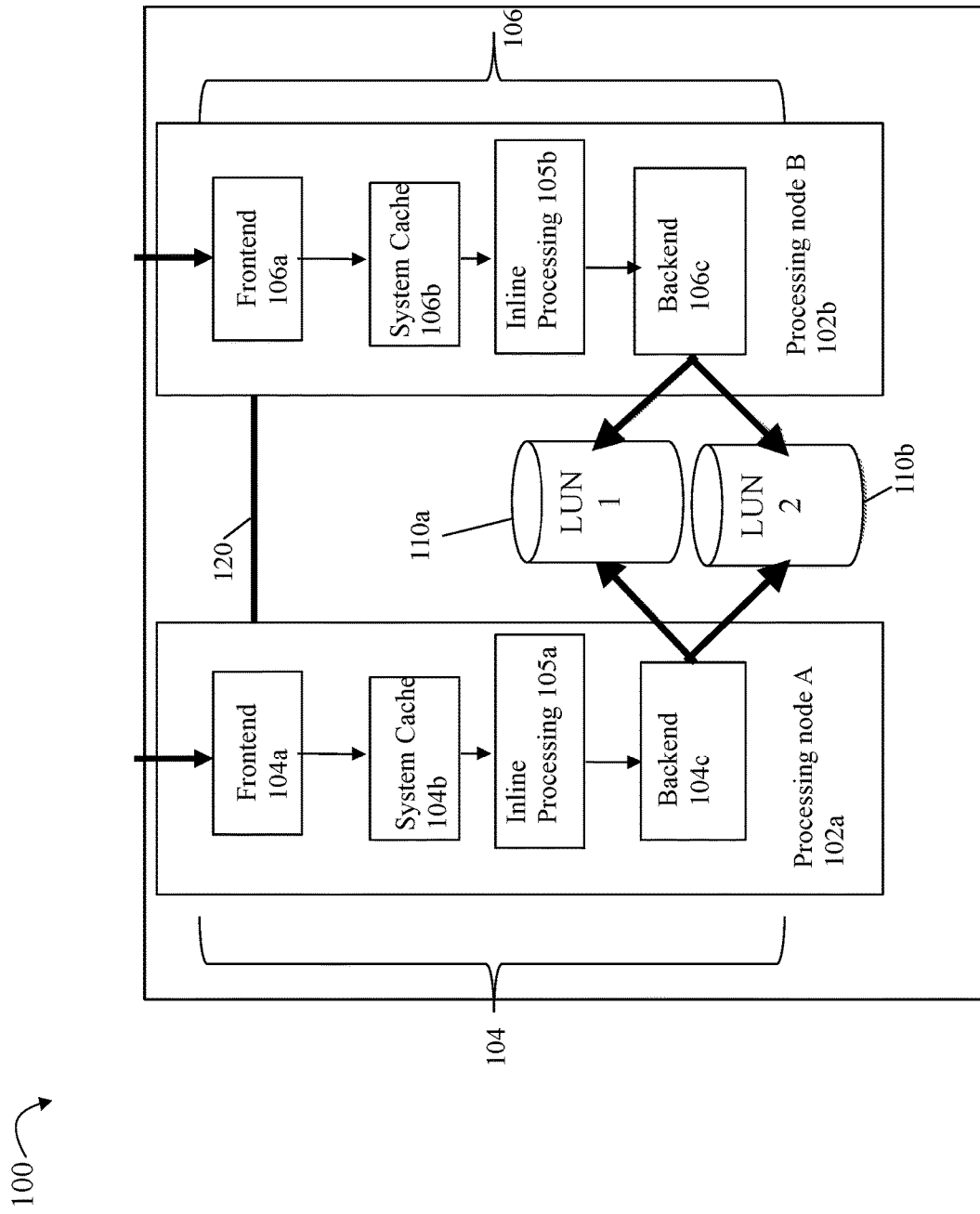
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the

104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* may be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 may be used for internode communication between the nodes 102*a*, 102*b*.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage. When the processor performs processing, such as in connection with the inline processing 105*a*, 105*b* as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102*a*-*b* in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102*a* is the peer node of the node B 102*b*, and the node B 102*b* is the peer node of the node A 102*a*.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair can process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by the one or more processors of each node. Each node of the pair may include its own resources such as its own processors, memory, cache and the like.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/O s (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active-unoptimized state for the LUN only if there is no active-optimized path for the LUN. A recognized path over which I/O s may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

In one system not using the techniques herein, the data storage system may set paths to one of the nodes for a particular LUN to the active-optimized setting and set other paths to the remaining node for the particular LUN to another ALUA state other than active-optimized. In this manner, as long as there is at least one functioning active-optimized path, the I/Os for the particular LUN may only be serviced by a single node. However, this system has a disadvantage with load balancing I/O workload between the two nodes of the system in that the host may perform load balancing over paths to only a single node. In other words, all active-optimized paths are between the host and the same single node. In the absence of additional logic, the ALUA state denoting the path settings for exposed LUNs are static. As a result, the I/O load on the two nodes can reach a state of imbalance and remain imbalanced for quite some time.

To solve the problem of I/O load imbalance between the nodes, described in the following paragraphs are techniques for load balancing that may be performed in an embodiment using a dynamic ALUA framework as well as other frameworks. In at least one embodiment, the techniques provide for monitoring the load on both nodes of the system or appliance to detect any workload imbalance. In response, action may be taken to remove or at least alleviate the unbalanced workload state and move the system and nodes into a more balanced state. Resource utilization between the two nodes may be transitioned into a balanced state by transferring LUN ownership. In an embodiment using dynamic ALUA, the LUN transfer of ownership or responsibility for I/O processing may be achieved logically or virtually by dynamically modifying the preferred (i.e., optimized) and non-preferred (i.e., non-optimized) path states for particular LUNs on one or more hosts. As described in more detail below, the techniques herein for load balancing may also be used in connection with other configurations such as with respect to load balancing across different data storage systems where LUN transfer may be achieved, for example, by data migration of the LUN and its data from a heavily loaded system to a less busy system.

Described in the following paragraphs are techniques that may be used in connection with dynamically modifying the associated ALUA states of paths for a particular one or more LUNs in order to rebalance the I/O load of the LUNs among the nodes of the data storage system. Determining whether to rebalance the I/O workload of LUNs between the two nodes may be performed in accordance with one or more trigger conditions that need to be met in order to trigger rebalancing of the workload between the nodes. In at least one embodiment, processing may include monitoring the current workloads of both nodes over time and periodically evaluating, in accordance with the one or more trigger conditions, whether to perform processing to rebalance the workloads of the nodes. One of the trigger conditions may specify that the utilization of at least one node exceeds a specified threshold utilization level. Another of the trigger conditions may specify that the current workloads of the nodes are determined to be imbalanced, such as in accordance with imbalance criteria. The imbalance criteria may specify, for example, that two nodes having a workload imbalance if the difference between the current workloads of the two nodes exceeds a specified maximum allowable difference. Responsive to determining, in accordance with the trigger criteria, that rebalancing of workload between the nodes is needed, the rebalancing may be performed.

In at least one embodiment in which the data storage system has two nodes, the LUNs exposed over target ports of the data storage system to one or more hosts may be initially assigned, partitioned or distributed among the two nodes for a preferred path designation. The LUNs may be initially partitioned in any suitable manner. In one embodiment, the LUNs may be distributed among the two nodes of the system using a round robin technique. A LUN distributed or assigned to a particular node means that the one or more paths to the particular node are designated as preferred paths for the LUN with all remaining paths to the other peer node designated as non-preferred paths for the LUN. Thus, the particular node to which a LUN is assigned may be characterized as the initial preferred node for the LUN where all paths to the preferred node may be initially assigned an active-optimized or preferred path state for the LUN. Additionally, the other peer node to which the LUN is not assigned may be characterized as the initial non-preferred node for the LUN where all paths to the non-preferred node may be initially assigned an active-non optimized or non-preferred path state for the LUN.

In at least one embodiment after the initial partitioning or assigning of the LUNs among the two peer nodes in the data storage system, processing may be performed in an ongoing continuous manner to measure the workload on both of the nodes. For example, a determination as to whether the one or more trigger conditions are met may be performed periodically at predetermined time intervals, may be performed responsive to certain events, may be performed on demand, and the like. If the one or more trigger conditions are true, processing may be performed to rebalance the workload of the LUNs among the two nodes. The rebalancing of the workload may include moving the I/O workload for one or more of the LUNs from a first busy node to a second non-busy peer node by modifying the ALUA path states of the one or more LUNs. In particular, the processing may modify the preferred path state of the one or more of the LUNs from the first busy node to the second non-busy node, where paths to the first busy node for the one or more LUNs may be modified from preferred to non-preferred paths, and where paths to the second non-busy node for the one or more LUNs may be modified from non-preferred to preferred paths. Responsive to the foregoing path state changes for the one or more LUNs, the host from which the paths originate may be notified by the data storage system regarding the path state changes. The notification may be characterized in one aspect as a hint regarding the path status changes for the one or more LUNs. In at least one embodiment, the host may use preferred paths for a LUN rather than non-preferred paths to send I/Os to the LUN. In this manner, the I/O workload for one or more LUNs may be shifted from a busy node to a non-busy node by modifying the path states for the LUNs to the busy node from preferred to non-preferred and by modifying the path states for the LUNs to the non-busy node from non-preferred to preferred. Selecting the particular one or more LUNs whose workload is shifted from the busy node to the non-busy node may be performed using any suitable technique. For example, in at least one embodiment, the busy node may be assigned as the preferred node with preferred paths for the one or more LUNs selected. Additionally the one or more LUNs selected may have the highest workload with respect to all LUNs assigned to the busy node as the preferred node.

In at least one embodiment, the host may use the current states of paths for a particular LUN to select a path over which to send I/Os directed to the particular LUN. In at least one embodiment, the host may select a path for a LUN designated as preferred over another path designated as non-preferred. If there are multiple preferred paths, the host may use any suitable technique to select one of the available multiple preferred paths for sending an I/O to the particular LUN. If no preferred paths are active or available or use, the host may select a non-preferred path for sending the I/O to the particular LUN. Thus, the data storage system may perform load balancing of the LUNs among the nodes of the data storage system by first changing the preferred path state and non-preferred path state for paths to the different nodes for the LUNs, and then providing notification regarding the path state changes for the LUNs to the host.

More generally, the techniques described in the following paragraphs for load balancing may be used in connection with other scenarios besides load balancing among two nodes of the same appliance or system using the ALUA path settings to logically move LUNs and workloads between the nodes. The techniques herein may be used in connection with load balancing between nodes of the same appliance or data storage system using a mechanism other than ALUA path settings to logical move LUNs and workloads between the nodes. For example, both nodes may be able or capable of servicing I/O s to the same set of LUNs in an active-active configuration where the LUN is exposed to the host over multiple paths to both nodes. However, for each LUN, one of the nodes may be assigned as the primary node handling I/Os for the LUN with the other peer node as the secondary node that takes over I/O handling for the LUN if the primary node fails. In such an embodiment, either node may receive an I/O for the LUN. If the receiving node is not the primary for the LUN, the I/O may be forwarded internally within the appliance to the primary peer node for servicing. Any data or other return information may be returned through the receiving node.

The techniques herein may be used in connection with load balancing across data storage systems or appliances such as those included in a cluster or federation. If the load balancing techniques described herein are applied to two appliances or data storage systems, LUNs may be physical moved or migrated from one appliance or data storage to another. Such migration may include moving the LUN by migrating the LUN's data from one appliance or data storage system another physical appliance or data storage system.

In at least one embodiment in accordance with the techniques herein, processing may include continuously monitoring the load on the nodes of a system, detecting an imbalance, and taking action to alleviate the imbalance to transition the system into a more balanced state. Since LUN I/O workload is transferrable between the nodes, resource utilization may be balanced by transferring LUN ownership. In an embodiment using dynamic ALUA as discussed elsewhere herein, LUN ownership may be transferred logically or virtually by changing the preferred or optimized path settings on the host(s). In the case of load balancing across different appliances or systems, LUN transfer may be achieved by data migration. The processing performed may also include validating that the nodes or systems transitioned to a desired more balanced state.

Thus, more generally stated, the techniques herein may be used in connection with balancing the I/O workload of given a set of volumes (i.e., LUNs) or VVOLs, V1, . . . , Vn, and a set of two or more storage server entities, where I/Os directed to such volumes or VVOLs may be serviced by any storage server entity in the set of two or more storage server entities. The storage server entities may include multiple data storage systems or appliances. The storage server entities may include multiple nodes in a single appliance or system. All storage server entities may be capable of servicing I/Os directed to any LUN or VVOL of the volume set. The I/Os may be issued by a host or other client that is external with respect to the storage server entities. It should be noted that the volume set of LUNs or VVOLs may more generally contain logical devices or other suitable storage entities that may be used in a particular embodiment.

The following paragraphs illustrate the use of the techniques herein in connection with two nodes in the same appliance or system using the dynamic ALUA framework. However, more generally, the techniques described in the following paragraphs may be used in connection with load balancing the load of the set of volumes or LUNs among any two or more storage server entities configured using the dynamic ALUA framework or any other suitable framework.

The techniques described in the following paragraphs provide for tracking what percentage of the system resources are consumed by each individual LUN or volume, and measuring the resource consumption of the different systems and LUNs in a way that makes them comparable. More specifically, the techniques herein solve the following problems:

1. Attribution: Relevant resources, such as CPU, RAM, and NVRAM are shared resources managed by the data path. Typically, a system may not maintain statistics on how these shared resources are allocated to individual volumes, and calculating such statistics is difficult. As such, one problem solved using the techniques described in the following paragraphs in connection with I/O work load balancing between different storage server entities such as two nodes of an appliance is determining what portion of shared resources are consumed or used by the different I/O workloads.

2. Internal (system) I/O: There may be additional I/O costs related to maintaining the system in a healthy state that are incurred at various points in time. For example, management or maintenance tasks such as garbage collection may be performed on a system as a background operation. Performing garbage collection may generate additional internal I/O operations. For example, processing may be performed to aggregate stored data blocks to eliminate smaller unused physical storage locations that may be interspersed between the data blocks. Such aggregation may include physically copying or moving data blocks stored at various physical locations on BE non-volatile storage into a single larger physical storage location. As such, another problem solved using the techniques described in the following paragraphs in connection with I/O workload balancing is identifying such additional I/O costs incurred at various points in time and determining what portion of the additional I/O costs are incurred by the different I/O workloads.

3. Normalization: The I/O stream that each node handles includes both reads and writes of varying sizes. Estimating the different costs of these I/Os and normalizing them in order to balance the I/O s between the two nodes or other storage server entities is non-trivial. As such, yet another problem solved using the techniques described in the following paragraphs in connection with I/O workload balancing is how to normalize the costs associated with the various I/O streams having different characteristics. Such normalized I/O costs or normalized I/O workloads may be compared using a similar scale in connection with determining when there is an unbalanced workload state as well as what actions to take to transition to a balanced workload state.

The techniques described in the following paragraphs for normalizing I/O workload are applied in connection with load balancing. More generally, such techniques for normalizing I/O workload have broader applicability such as, for example, to estimate the cost of replication and synchronization across data storage sites.

The foregoing and other aspects of the techniques herein are described in more detail in following paragraphs.

The techniques described in the following paragraphs use a novel approach based on the following principles. First, resource consumption may be attributed directly to the I/O requests the system is handling rather than, for example, measure utilization of each resource separately. Second, I/Os having different characteristics, such as different sizes or payloads as well as different I/O types (e.g., reads and writes) may be compared after normalization.

Described in the following paragraphs are two ways in which I/Os may be normalized for use with the techniques herein such as with load balancing. In one aspect, the two I/O normalization techniques may be characterized as complementary methods based on underlying relationships between IOPS (I/Os per second) and I/O size. More generally, IOPS denotes an I/O rate or throughput having a relationship to the I/O size.

Using one method described below, an I/O workload may be normalized based on I/O cost associated with each single I/O. Additionally, an I/O workload may be normalized using a second method based on a normalized I/O rate or throughput, such as a normalized value for IOPS associated with a particular set or group of I/Os, where I/Os of the same set or group have the same characteristics. Multiple I/Os may be included in the same set or group for purposes of normalization if such I/Os have common characteristics such as the same I/O type and are serviced by systems having the same configuration. For example, multiple I/Os may have the same I/O type such as are all read I/O operations or all write I/O operations. As another example, multiple I/Os of the same set or group of I/Os being normalized are serviced on one or more systems having the same system configuration. In this context, the system configuration may include the same resource configuration such as shared resources including the same number of CPUs and/or the same number of processing cores, the same amount of cache and memory, and the like. Both of these methods use the same underlying relationship between IOPs and I/O size, but differ in their mathematical formulation. As discussed in more detail below, generally, the maximum I/O throughput or IOPS that is system is capable of may be characterized as inversely proportional to the I/O size. At least one embodiment in accordance with the techniques herein may use one or both of these I/O normalization methods or techniques.

The first method provides for I/O normalization based on a normalized I/O cost of a single I/O operation. A total normalized I/O cost for a particular set or group of "N" I/Os having the same characteristics may be determined using this first method by then multiplying the normalized cost of a single I/O operation having the characteristics by N, the number of I/Os in the set or group. Generally, N may be a positive integer value.

In at least one embodiment in accordance with the techniques herein, the normalized I/O cost of the first method may be expressed as a linear combination of the cost of the read or write operation itself and the number of bytes read or written. The normalized I/O cost may be expressed as in EQUATION 1 below:

$$\text{Normalized I/O cost} = a + (b * \text{I/O size}) \qquad \text{EQUATION 1}$$

where:

a and b are constants or coefficients selected in accordance with the characteristics of the I/O being normalized; and I/O size is the size of the I/O data payload for the I/O being normalized.

The coefficients a and b may depend on, and vary with, the characteristics including the I/O type and the system configuration. In some embodiments, the coefficients a and b may depend on, and vary with, the characteristics including the I/O type and the system configuration as well as the state of the workload of the system. To further illustrate, consider use of the first method for I/O normalization based on I/O cost with 2 nodes in a single system. In this case, there is only a single configuration for all I/Os to be normalized. In this example, further assume that there are read and write I/Os of two different sizes, such as 4K bytes and 8K bytes. In this example, a first set of values (a1, b1) may be specified respectively as the values for the coefficients a and b for read I/Os of size 4K; a second set of values (a2, b2) may be specified respectively as the values for the coefficients a and b for read I/Os of size 8K; a third set of values (a3, b3) may be specified respectively as the values for the coefficients a and b for write I/Os of size 4K; and a fourth set of values (a4, b4) may be specified respectively as the values for the coefficients a and b for write I/Os of size 8K. In this manner, EQUATION 1 may be used to determine a normalized I/O cost for an I/O operation that is of a particular type, a particular size and associated with a particular system configuration in which the I/O operation is serviced or processed by selecting particular values for the coefficients a and b based on the particular I/O type, I/O size and system configuration associated with the I/O operation.

The pairs of values for the coefficients a and b of EQUATION 1 may be established by running I/O load tests with various I/O sizes and observing when the system reaches its maximum I/O throughput or IOPS rate for each of the various sizes.

Given different values for the coefficients a and b and using EQUATION 1, processing may be performed to convert read I/Os and write I/Os of any size to normalized units which may be referred to, respectively, as read units and write units. The normalized units may then be used for comparison purposes and use with the techniques herein for load balancing.

Figure 3A:
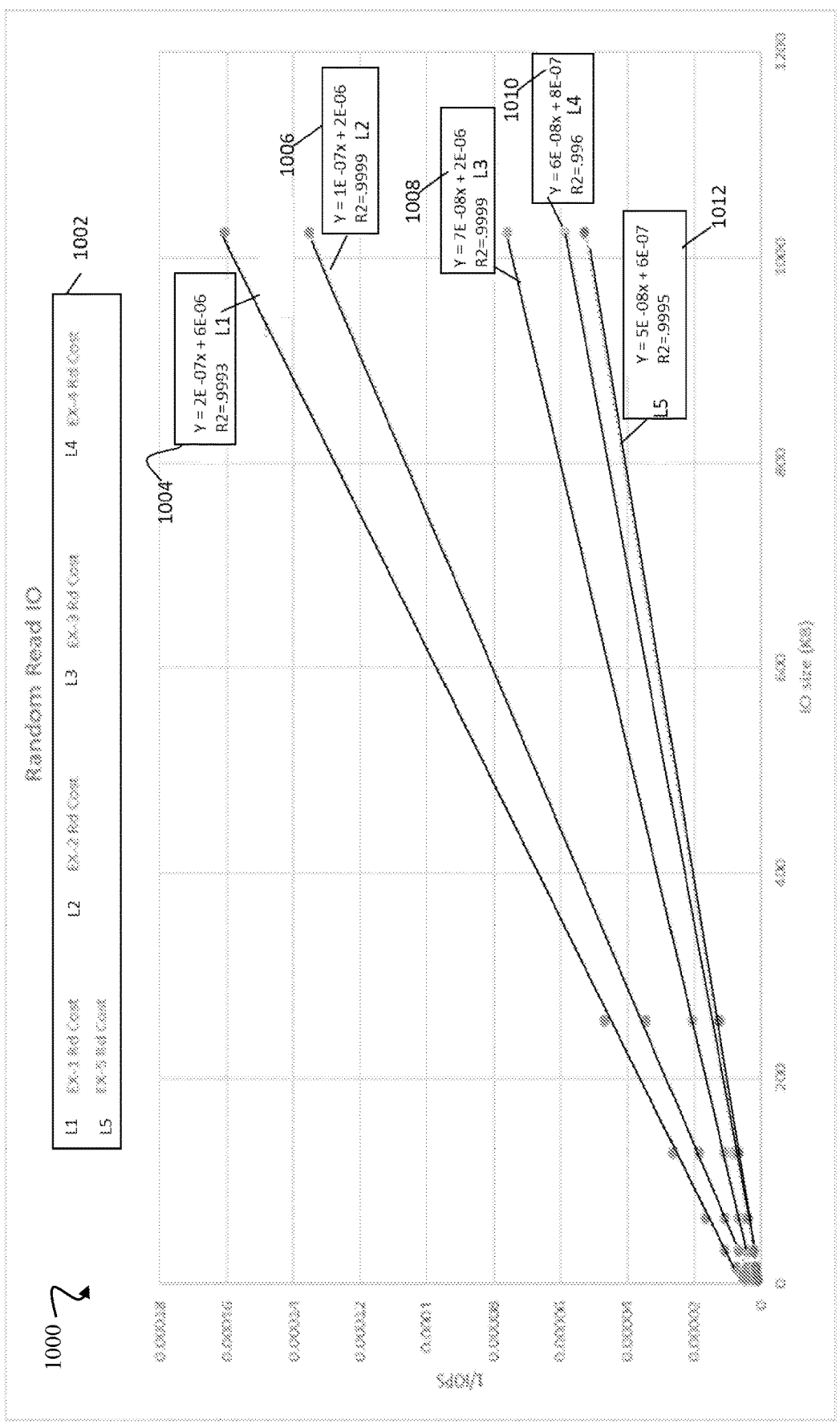
FIGS. 3A and 3B are graphical illustrations of the relationship between 1/I/Os per second (IOPS) and I/O size for various configurations in an embodiment in accordance with the techniques herein.
Figure 3B:
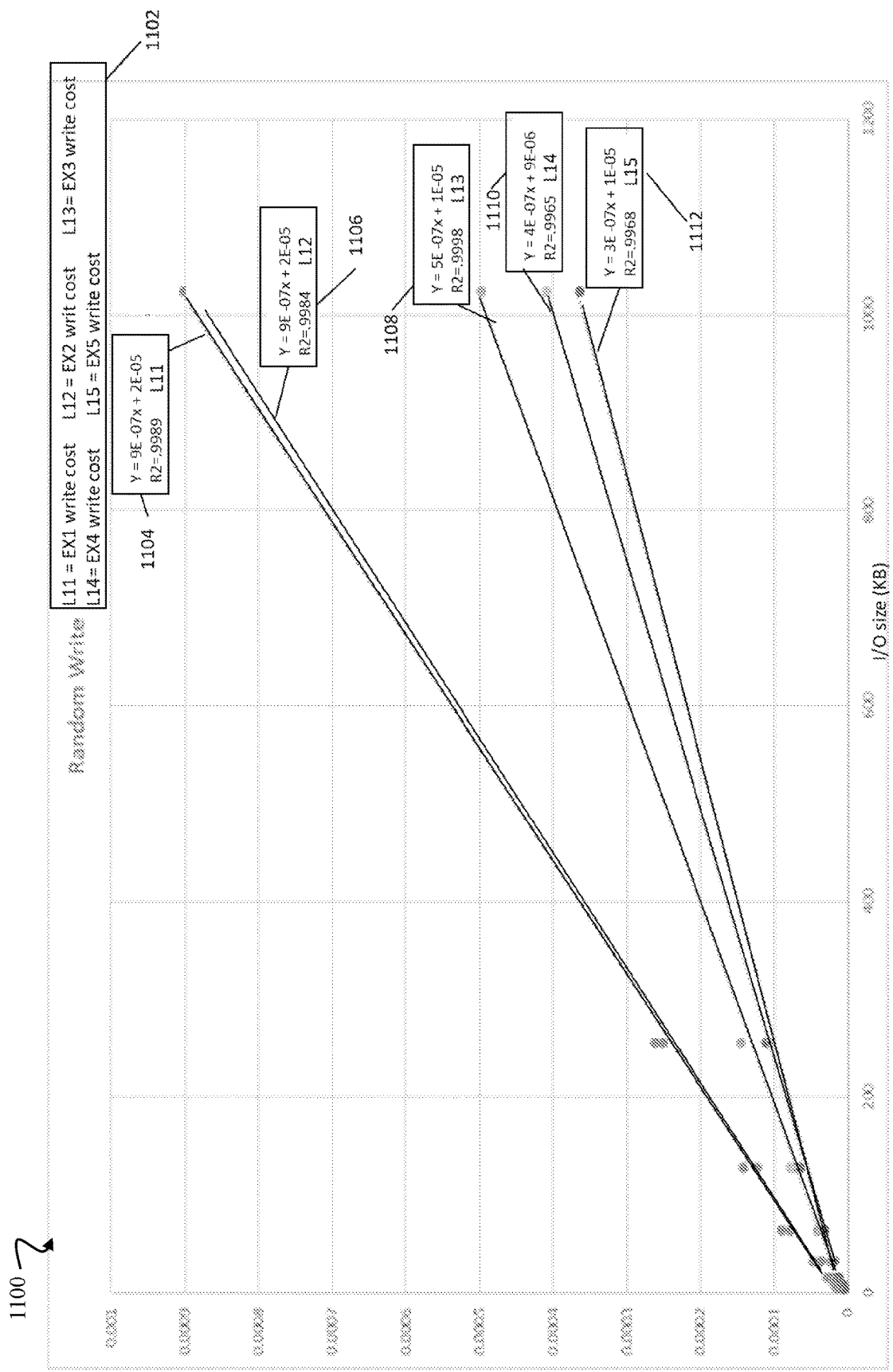

The FIGS. 3A and 3B show performance results obtained by the inventors that support the modeling for a normalized I/O as expressed using EQUATION 1.

Referring to FIG. 3A, shown is an example 1000 of a graph illustrating performance results obtained by the inventors supporting the correctness and accuracy of the model for normalization based on read I/O cost as expressed using EQUATION 1.

In the example 1000, the X axis is I/O size (in kilobytes or KBs), and the Y axis is 1/IOPS (e.g., the inverse of the IOPS denoting the maximal read I/O throughput or read I/O rate per second discussed elsewhere herein). The example 1000 includes the legend 1002 indicating that the lines or curves L1-L5 denote normalized read I/O costs determined using EQUATION 1, respectively, for 5 different configurations: EX1-EX5. Each of the 5 different configurations may differ in terms of system or appliance resources such as, for example, the number of cores, the amount of cache, the amount of memory, and the like.

The element 1004 indicates that for a first configuration EX1, the coefficient a=6E-06 and the coefficient b=2E-07 used with EQUATION 1. It should be noted that the foregoing values for a and b, as well as others herein, are expressed in terms of scientific notation where, for example, 6 E-06 represents $6 \times 10^{\wedge}-6$ or $6 \times 10^{-6}$. The line L1 is a fitted curve obtained using experimental data points based on observed values. The experimental data points are obtained by running load tests for various I/O sizes of read I/Os on the system having the first configuration EX1 to determine when the system reaches its maximal I/O throughput capability. For the fitted curve L1, the foregoing values for a and b as expressed in 1004 may be determined. The value R2 in the element 1004 denotes the coefficient of determination, also sometimes expressed as $R^2$ or $r^2$ or "R squared", for the fitted line or curve L1. As known in the art, R squared is a statistical measure that represents the proportion of the variance for a dependent variable that is explained by, or predictable from, an independent variable or variables in a regression model. R-squared evaluates the scatter of the data points around the fitted regression line such as L1. Higher R-squared values represent smaller differences between the observed data and the fitted values. R-squared is a value between 0 and 1, inclusively. where a value of 1 or 100% indicates that the model or fitted curve explains all the variability of the response data around its mean thus the higher the R-squared, the better the model or fitted curve fits your data. As indicated by the element 1004, the R squared value for the curve L1 is 0.9993.

In a similar manner, the curves L2-L5 are fitted for experimental data points obtained by running load tests for various I/O sizes of read I/Os on systems, respectively, having the configurations EX2-EX5 to determine when the system reaches its maximal I/O throughput capability. The elements 1006, 1008, 1010 and 1012 denote the coefficient values (for a and b) used with EQUATION 1 to determine normalized I/O costs and the R squared values, respectively, for the fitted curves L2-L5.

Referring to FIG. 3B, shown is an example 1100 of a graph illustrating performance results obtained by the inventors supporting the correctness and accuracy of the model for normalization based on write I/O cost as expressed using EQUATION 1.

In the example 1100, the X axis is I/O size (in kilobytes or KBs), and the Y axis is 1/IOPS (e.g., the inverse of IOPS denoting the maximal write I/O throughput or write I/O rate per second). The example 1100 includes the legend 1102 indicating that the lines or curves L11-L15 denote normalized write I/O costs determined using EQUATION 1, respectively, for the 5 different configurations EX1-EX5 noted above in connection with the example 1000.

In a manner similar to the curves L1-L5 of the example 1000, the curves L11-L15 are fitted for experimental data points obtained by running load tests for various I/O sizes of write I/Os on systems, respectively, having the configurations EX1-EX5 to determine when the system reaches its maximal I/O throughput capability. The elements 1104, 1106, 1108, 1110 and 1112 denote the coefficient values (a and b) and R squared values, respectively, for the fitted curves L11-L15.

What will now be described is the second method that may be used to normalize I/Os based on normalized IOPS.

Figure 3C:
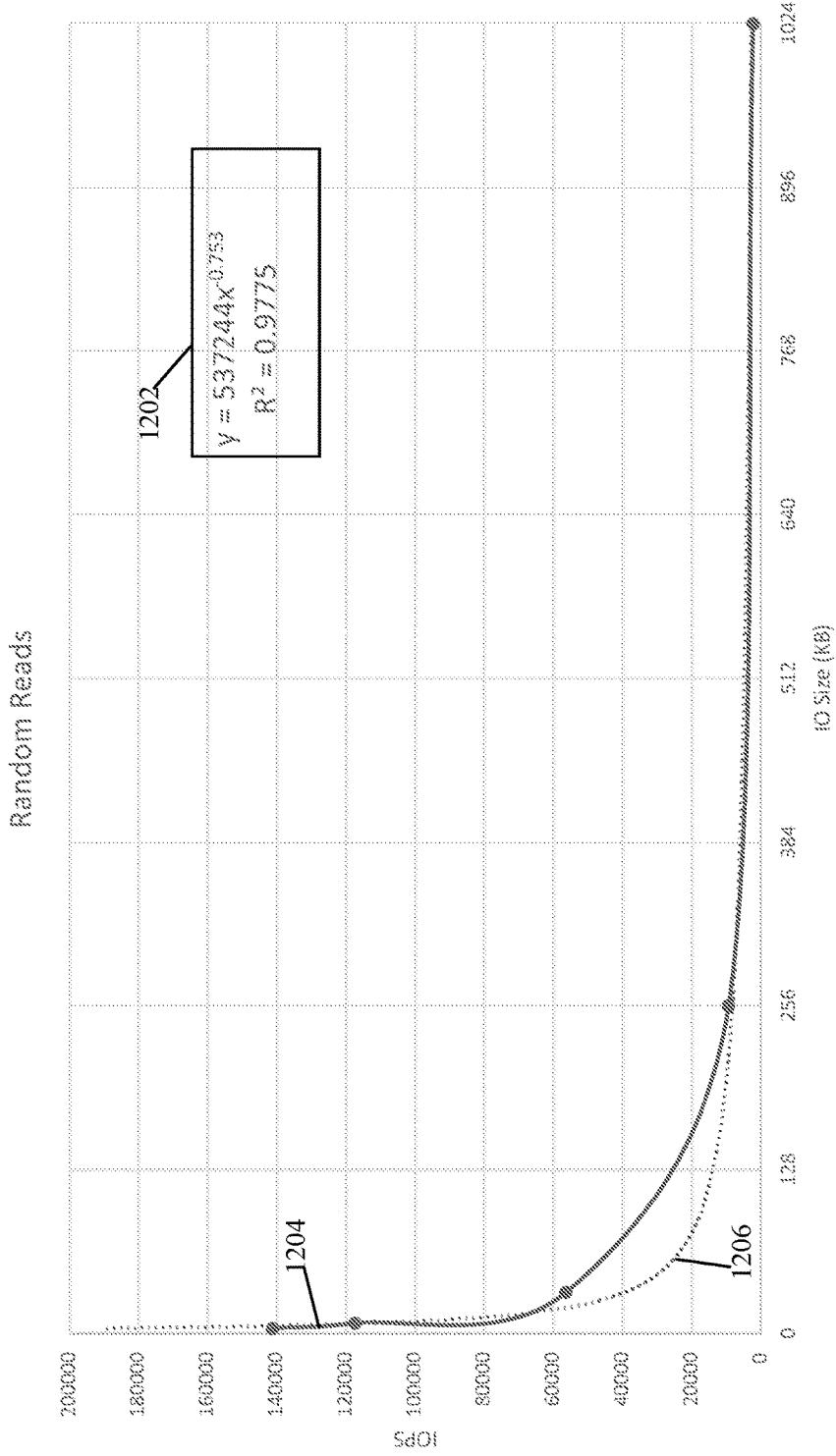
FIGS. 3C and 3D are graphical illustrations of the inverse relationship between I/Os per second (IOPS) and I/O size for a particular configuration in an embodiment in accordance with the techniques herein.
Figure 3D:
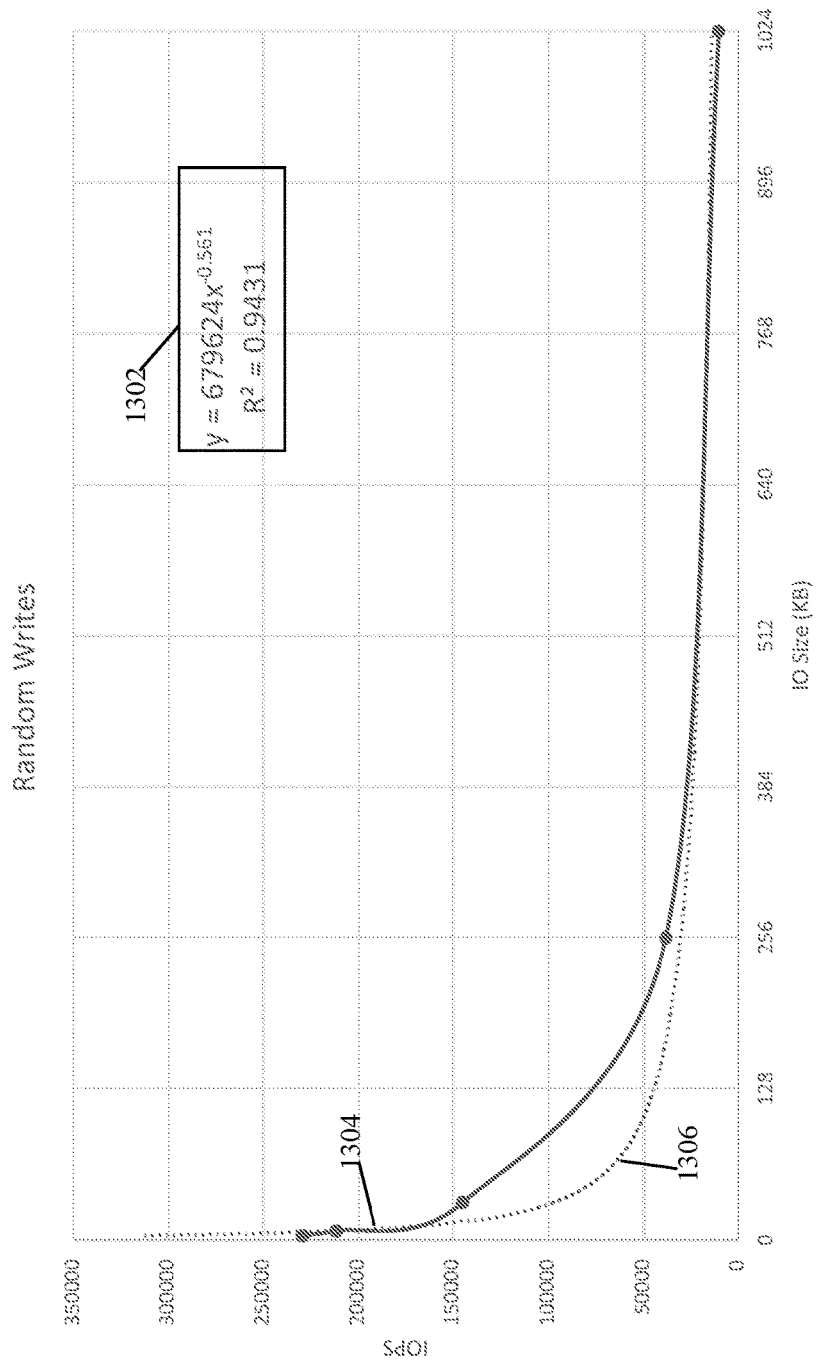

FIGS. 3C and 3D discussed below show the variation of IOPS vs. the I/O size for read and write operations for the EX1 configuration noted above. From the graphs illustrated in the FIGS. 3C and 3D discussed below in more detail, it can be observed that both the read IOPS and the write IOPS vary inversely with the I/O size. The data points for various IOPS illustrated in the FIGS. 3C and 3D correspond to the maximum I/O throughput or IOPS rate for each of the various sizes. The maximum I/O throughput rate such as expressed in IOPS in connection with FIGS. 3C and 3D are as described elsewhere herein.

Additionally, the FIGS. 3C and 3D show performance results obtained by the inventors that support the modeling for IOPS and normalized IOPS as expressed, respectively, using EQUATION 2 and EQUATION 3 presented in the following paragraphs.

Consistent with FIGS. 3C and 3D discussed below, the inverse relationship between maximum IOPS and I/O sizes, and thus any IOPS values and I/O sizes, may be modeled as expressed in EQUATION 2:

$$IOPS = A/(I/O\ Size)^B \qquad \text{EQUATION 2}$$

where

IOPS denotes the I/O throughput rate in IOPS;

I/O size denotes the size or data payload of the I/O operation; and

A and B are constants or coefficients selected in accordance with the characteristics of the I/Os of the IOPS.

In a manner similar to that as described in connection with the coefficients a and b of EQUATION 1, the coefficients A and B may depend on, and vary with, the characteristics including the I/O type and the system configuration. In some embodiments, the coefficients A and B may depend on, and vary with, the characteristics including the I/O type and the system configuration as well as the state of the workload of the system. To further illustrate, consider use of the EQUATION 2 based on IOPS associated with 2 nodes in a single system. In this case, there is only a single configuration for all IOPS. In this example, further assume that there are read and write I/Os of two different sizes, such as 4K bytes and 8K bytes. In this example, a first set of values (A1, B1) may be specified respectively as the values for the coefficients A and B for read IOPS of size 4K; a second set of values (A2, B2) may be specified respectively as the values for the coefficients A and B for read IOPS of size 8K; a third set of values (A3, B3) may be specified respectively as the values for the coefficients A and B for write IOPS of size 4K; and a fourth set of values (A4, B4) may be specified respectively as the values for the coefficients A and B for write IOPS of size 8K. In this manner, EQUATION 2 may be used to express the inverse relationship between IOPS and I/O size where the IOPS value includes I/Os of a particular I/O type, a particular size and associated with a particular system configuration in which the I/Os are serviced or processed by selecting particular values for the coefficients A and B based on the particular I/O type, I/O size and system configuration associated with the I/Os comprising the IOPS.

The pairs of values for the coefficients A and B of EQUATION 2 may be established by running I/O load tests with various I/O sizes and observing when the system reaches its maximum I/O throughput or IOPS rate for each of the various sizes.

EQUATION 2 may be used to further normalize IOPS in accordance with any specified base I/O size, denoted as $iosize_{norm}$. For example, assume that iops1 denotes the IOPS rate for a given I/O size, iosize1. Based on EQUATION 2, the following relationship exists between iops1 and iosize1:

$$iops1 = A/(iosize1)^B$$

To normalize iops1 of iosize1 to IOPS of size $iosize_{norm}$ on the same system then the following follows:

$$iops_{norm} = A/iosize_{norm}^B$$

$$iops_{norm}/iops1 = (A/iosize_{norm}^B)/(A/iosize1^B)$$

$$iops_{norm} = iops1(iosize1/iosize_{norm})^B \qquad \text{EQUATION 3}$$

Thus, $iops_{norm}$ as expressed using EQUATION 3 denotes an equivalent normalized IOPS value for iops1. Put another way, (iops1, iosize1) may denote a point to be normalized where iops1 denotes an I/O rate per second of I/Os of size iosize1. $iosize_{norm}$ denotes the base size or standard size used for normalization to scale the point (iops1, iosize1) to a normalized corresponding point ($iops_{norm}$, $iosize_{norm}$), where $iops_{norm}$ may be determined using EQUATION 3. To further illustrate, assume the $iosize_{norm}$=4K bytes. In this case, EQUATION 3 may be used to normalize any IOPS value, iops1, for I/Os of iosize1 to an equivalent normalized IOPS value, $iops_{norm}$. Using EQUATION 3 with the same base size or standard size, $iosize_{norm}$, for multiple input IOPS values of different I/O sizes provides for scaling or normalizing the input IOPS values using the same base or standard size where such normalized IOPS values may then be used as normalized units for comparison purposes and use with the techniques herein for load balancing.

It can thus be noted that when normalizing IOPS on the same system or appliance, the coefficient A has no impact since the configuration is the same. The foregoing as discussed in connection with EQUATION 2 and EQUATION 3 are equally applicable to any configuration, (e.g. EX1-EX5), but with specific values for the coefficients A and B for each configuration.

Referring to FIG. 3C, shown is an example 1200 of a graph illustrating performance results obtained by the inventors supporting the correctness and accuracy of the model for read IOPS as expressed using EQUATION 2 and also the normalized read IOPS as expressed using EQUATION 3.

The example 1200 illustrates the variation of read IOPS (Y axis) vs. I/O size (X axis) for read I/O operations using the EX1 configuration. The curve 1204 denotes the fitted curve obtained from experimental data points obtained by running load tests for various I/O sizes of read I/Os on a system having the EX1 configuration to determine when the system reaches its maximal I/O throughput capability (IOPS). It can be observed from the curve 1204 in the example 1200 that the maximal read IOPS (Y axis values) vary inversely with the I/O size (X axis values). The element 1202 includes an equation, $Y=537244x^{-0.753}$, with A and B coefficient values, where A=537244 and B=0.753; and the associated R squared value=0.9775. The curve 1206 denotes the curve represented by the equation $Y=537244x^{-0.753}$ as included in the element 1202.

Referring to FIG. 3D, shown is an example 1300 of a graph illustrating performance results obtained by the inventors supporting the correctness and accuracy of the model for write IOPS as expressed using EQUATION 2 and also the normalized write IOPS as expressed using EQUATION 3.

The example 1300 illustrates the variation of write IOPS (Y axis) vs. I/O size (X axis) for write I/O operations using the EX1 configuration. The curve 1304 denotes the fitted curve obtained from experimental data points obtained by running load tests for various I/O sizes of write I/Os on a system having the EX1 configuration to determine when the system reaches its maximal I/O throughput capability (IOPS). It can be observed from the curve 1304 in the example 1300 that the maximal read IOPS (Y axis values) vary inversely with the I/O size (X axis values). The element 1302 includes an equation, $Y=679624x^{-0.0561,}$ with A and B coefficient values, where A=679624 and B=0.561, and the associated R squared value=0.9431. The curve 1306 denotes the curve represented by the equation $Y=679624x^{-0.561}$ as included in the element 1302.

Based on the results obtained by the inventors as illustrated in FIGS. 3C and 3D, the maximum or maximal IOPS a system is capable of handling is inversely proportional to the I/O size. More generally and consistent with other discussion herein such as in connection with EQUATION 2 and EQUATION 3, the maximum number of I/Os within a given unit of time (e.g., IOPS or I/O rate) that a system is capable of servicing at saturation is inversely proportional to the I/O size.

Figure 4:
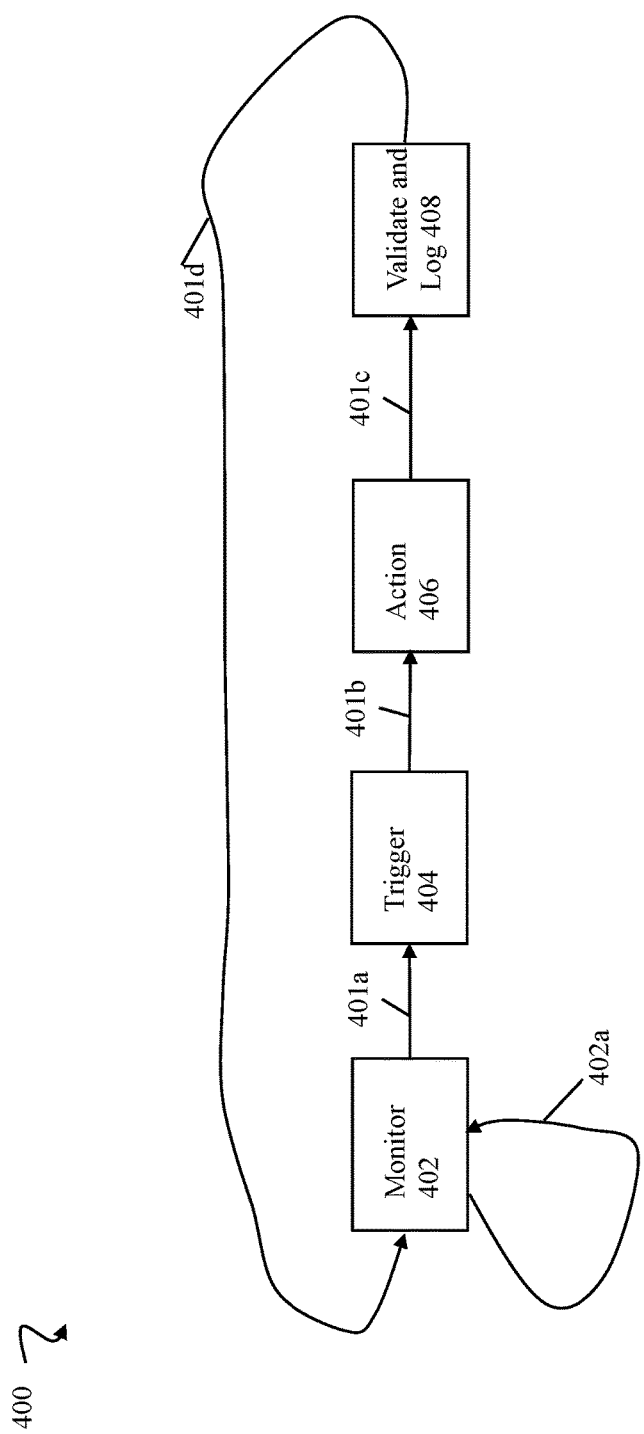
FIG. 4 is an example illustrating processing stages or phases that may be performed in an embodiment in accordance with the techniques herein.

What will now be described with reference to FIG. 4 is processing that may be performed in connection with load balancing in an embodiment in accordance with the techniques herein. Generally, the example 400 of FIG. 4 outlines phases or stages of processing that may be performed in connection with detecting an unbalanced workload state between two nodes of an appliance and performing steps to further alleviate the detected unbalanced state thereby transitioning the system to a state having a more balanced workload between the two nodes of the appliance or system.

In summary, the processing of FIG. 4 detects an I/O workload imbalance or "gap" between the nodes, and takes action to correct or alleviate imbalance. In at least one embodiment, determining whether there is an I/O workload imbalance may be performed using normalized I/O workloads for read I/Os and write I/Os separately. In this manner, a first gap or difference with respect to read I/O workload of the 2 nodes may be evaluated to determine whether there is a read I/O workload imbalance. Additionally, a second gap or difference with respect to write I/O workload of the 2 nodes may be evaluated to determine whether there is a write I/O workload imbalance.

For each type of I/O workload, a percentage or equivalent decimal value may be determined for each node denoting the relative percentage of the I/O workload on that node. For example, for read I/O workload, based on the total aggregate read I/O workload of the two nodes, where 100% denotes the total aggregate read I/O workload, a percentage between 0 and 100% inclusively is assigned to each node based on the portion of the read I/O workload on that node. The gap may denote the difference between the two percentages assigned to the two nodes for a particular type of I/O workload. For example, assume that node A has 30% or 0.30 of the total aggregate read I/O workload and node B has 70% or 0.70 of the total aggregate read I/O workload. In this case, the gap for the read I/O workload is 0.4 or 40%.

The ideal balance is to have a gap=0 for each of the read I/O workload and the write I/O workload. However, for practical reasons, an embodiment may define a required balance for 2 nodes as a range [q, 1-q], denoting that for each node its read I/O workload and write I/O workload should be in the target range [q, 1-q] of the total (so the gap is <=|1-2q|). In the foregoing target range, q denotes a decimal value between 0 and 1, inclusively. In at least one embodiment a default value for q may be specified. For example, in at least one embodiment the default q may be 0.3, thereby having a corresponding target range of [0.3-0.7] for the I/O workload of each node. An embodiment may use the same or different q values for the read I/O workload and the write I/O workload. It should be noted although this example described in the following paragraphs is with respect to a system with 2 nodes, the processing described in the following paragraphs may be readily extended for use with a larger number of nodes.

The processing described below in connection with FIG. 4 for load balancing may also consider the aggregate or overall utilization of the system, defined as the number of I/Os performed by the system in a given time period divided by the maximum number of I/Os the system is capable of performing in this time period, whereby the aggregate or overall utilization may be expressed as a percentage. The aggregate or overall utilization may be expressed as in EQUATION 4 below:

$$\text{Aggregate or Overall Utilization }(P) = \frac{\text{\# IOPS node } A(P) + \text{\# IOPS node } B(P)}{\text{MAX IOPS node } A(P) + \text{MAX IOPS node } B(P)} \quad \text{EQUATION 4}$$

where

P denotes the time period or an amount of elapsed time;

IOPS node A(P) denotes the number of I/Os processed by node A in time period P;

IOPS node B(P) denotes the number of I/Os processed by node B in time period P;

MAX IOPS node A(P) denotes the maximum number of I/Os the node A is capable of processing during the time period P; and MAX IOPS node B(P) denotes the maximum number of I/Os the node B is capable of processing during the time period P.

In at least one embodiment in connection with processing described below performed in FIG. 4, the IOPS and MAX IOPS values for the nodes A and B used in EQUATION 4 may be normalized I/O workload values determined using one of the two I/O normalization methods described elsewhere herein. Thus, as used in EQUATION 4 in at least one embodiment,

IOPS node A(P) may denote the total aggregated normalized units (e.g., the sum of the read units and write units) of node A processed in the time period P;

IOPS node B(P) denotes the total aggregated normalized units (e.g., the sum of the read units and write units) of node B processed in the time period P;

MAX IOPS node A(P) denotes the maximum number of normalized units (e.g., the sum of the read units and write units) the node A is capable of processing during the time period P; and MAX IOPS node B(P) denotes the maximum number of normalized units (e.g., the sum of the read units and write units) the node B is capable of processing during the time period P.

In at least one embodiment, if the aggregate or overall utilization determined using EQUATION 4 for the system is below a specified threshold, such as 50%, a detected imbalance may be allowed to persist without taking any corrective action. If a current utilization level is below the specified utilization threshold, such as 50%, it may be determined that the current utilization level even if imbalanced does not have a detrimental or adverse effect on the system performance so no rebalancing of the LUNs is performed. The utilization threshold may be included in one or more utilization criteria.

In at least one embodiment, rather than evaluate the overall or aggregate utilization with respect to the system, an embodiment may apply utilization criteria including an associated threshold individually to each node. The following EQUATION 5A expresses one way in which node level utilization may be determined for one of the nodes, node A:

$$\text{Node level utilization for Node } A = \frac{\# \text{ IOPS node } A(P)}{\text{MAX IOPS node } A(P)} \quad \text{EQUATION 5A}$$

Similarly, an embodiment may compute the node level utilization for the other peer node B as expressed in EQUATION 5B;

$$\text{Node level utilization for Node } B = \frac{\# \text{ IOPS node } B(P)}{\text{MAX IOPS node } B(P)} \quad \text{EQUATION 5B}$$

In at least one embodiment in connection with processing described below performed in FIG. 4 and consistent with use of the values in EQUATION 4, the IOPS and MAX IOPS values for the nodes A and B used in EQUATIONS 5A and 5B may be normalized I/O workload values determined using one of the two I/O normalization methods described elsewhere herein. Thus, as used in EQUATIONS 5A and 5B in at least one embodiment, the following: #IOPS node A(P), #IOPS node B(P), MAX IOPS node A(P), and MAX IOPS node B(P), may be as described above in connection with EQUATION 4.

With the node level utilization, the utilization criteria may specify that if either the node level utilization for node A exceeds a specified threshold, or if the node level utilization for node B exceeds a specified threshold, then the utilization criteria is met. The thresholds used for node level utilization and aggregate or overall utilization comparisons may be different. As described in more detail below, in at least one embodiment, load rebalancing may be performed in response to multiple trigger conditions being met. The multiple trigger conditions may be based on both utilization criteria and also imbalance criteria. The multiple trigger conditions may include a first trigger condition based on utilization criteria being met or true when at least one of the nodes has a node level utilization exceeding a specified threshold such as 50%. The multiple trigger conditions may also include a second trigger condition based on imbalance criteria being met or true when one of the I/O workload gaps exceeds a specified allowable gap threshold.

In connection with processing described below in connection with FIG. 4, all I/O workloads are normalized to read units and write units. The I/O workloads of the nodes and LUNs used in connection with FIG. 4 may be normalized, for example, using one of the two I/O normalization methods described elsewhere herein.

Referring to FIG. 4, a monitoring phase or processing stage 402 may be performed that generally includes monitoring the I/O workloads of the two nodes. The monitoring stage 402 may be performed periodically, such as every p seconds or minutes, to determine whether to proceed to the next trigger phase 404. In at least one embodiment, a default value of p may be 15 minutes. Thus, for example, at the end of each 15 minute time interval, the monitoring phase 402 may be performed.

The monitoring 402 may include a step S1 for periodically measuring the utilization of each node during the last p seconds or minutes. The utilization of each node may be determined as expressed using EQUATIONS 5A and 5B using normalized read and write units.

Subsequent to performing the step S1, the monitoring phase 402 may include performing a step S2. In the step S2, processing is performed to determine whether the utilization of at least one node exceeds the specified threshold and whether there is an imbalance in workload between the nodes. In at least one embodiment, normalized I/O workloads may be used in the step S2 when determining the utilizations of the nodes. Additionally, normalized I/O workloads may be used when determining the gaps or differences in node workloads. In at least one embodiment, an imbalance in workload with respect to the nodes may be determined using imbalance criteria. In at least one embodiment, the step S2 may include determining a first gap or difference with respect to read I/O workload of the 2 nodes and then determining whether there is a read I/O workload imbalance, where the first gap or difference exceeds a specified allowable read gap threshold of the imbalance criteria. Additionally, a second gap or difference with respect to write I/O workload of the 2 nodes may be determine and then evaluated to determine whether there is a write I/O workload imbalance, where the second gap or difference exceeds a specified allowable write gap threshold of the imbalance criteria. In at least one embodiment, an imbalance in the workload with respect to the nodes may be determined if the first gap exceeds the read gap threshold or if the second gap exceeds the write gap threshold.

Responsive to determining in the step S2 that: a) at least one node has a utilization exceeding a specified threshold; and b) determining that there is an imbalance with respect to any of the read workload and the write workload between the nodes, processing may proceed 401a to the trigger phase or stage 404. Otherwise, processing remains in the monitoring phase 402 (as denoted by the arrow 401a) until the next occurrence of the time interval p elapsing.

Thus, in at least one embodiment, the monitoring phase 402 as described above performs processing to evaluate utilization and workload imbalance at the per node level. As discussed below, in at least one embodiment, the trigger phase 404 may determine and further evaluate the normalized I/O workload in terms of read units and write units per LUN.

The trigger phase 404 may include a step S11 where processing is performed to read the I/O statistics for the LUNs on the nodes in the last or most recent time period p. From the step S11, control proceeds to a step S12 of the trigger phase 404. The step S12 of the trigger phase 404 may include normalizing the I/O workloads for the LUNs into read units and write units using one of the I/O normalizing techniques or methods described above. For example, in at least one embodiment, the I/O normalization of the I/O workloads for each LUN may be performed using the second I/O normalization method to determine a first normalized IOPS value in read units for read I/Os directed to the LUN during the most recent time period p, and a second normalized IOPS value in write units for write I/Os directed to the LUN during the most recent time period p. Consistent with discussion above, for example, using the second normalization method based on EQUATIONS 2 and 3, such normalization may use values for the coefficients A and B selected in accordance with the I/O type and the system configuration and optionally any other relevant characteristic(s). The normalized I/O workloads of the LUNs may be used in subsequent processing such as, for example, the processing performed by the trigger phase 404 when the load balancing algorithm is determining which LUNs to move between nodes. The normalized I/O workloads of the LUNs may be used to determine the expected resulting workload state of the nodes after LUNs are moved between the nodes.

After the step S12, processing may be performed in the step S13 of the trigger phase 404 to filter out or remove from consideration as a candidate for movement to another node any ineligible LUNs. A LUN may be ineligible or removed as a candidate for movement for any particular reason or condition that may vary with embodiment. For example, in at least one embodiment, LUNs ineligible for movement may include: LUNs configured as NAS (network attached storage) volumes, LUNs that are being migrated or replicated, snapshots such as read/write snapshots, clones, and possibly other items. From the step S13, control proceeds to the step S14 of the trigger phase 404.

The step S14 of the trigger phase 404 may perform processing to logically merge any LUNs that should be moved together as a single atomic unit. For example, two or more LUNs determined to have a high level of mutual deduplication may be moved as a group or unit in order to maintain the level of deduplication. For example, two LUNs that contain identical data blocks may be characterized as having a high level of mutual deduplication. The two LUNS having a high mutual deduplication should be kept together and may be logically merged or treated logically as a single LUN or volume for purposes of load balancing. Techniques for determining mutual deduplication with respect to two or more LUNs are described, for example, in U.S. patent application Ser. No. 17/110,672, filed Dec. 3, 2020, Techniques for ESTIMATING DEDUPLICATION BETWEEN STORAGE VOLUMES, Dar et al., which is incorporated by reference herein.

From the step S14, control proceeds to the step S15 of the trigger phase 404. In the step S15, processing may be performed to invoke a load balancing algorithm that determines one or more LUN movements with the goal of balancing both normalized read and write I/O workloads between the nodes. In at least one embodiment, the load balancing algorithm may determine such LUN movements with a goal or target of balancing both the normalized read I/O workload and the normalized write I/O workload so that each node has an associated expected read I/O workload percentage or value in the specified target range for read workload, and each node has an associated expected write I/O workload percentage or value in the specified target range for write workload. For example, described above is an example where the percentages individually for the read and write workloads of a node should be in the target range [0.3, 0.7] (e.g., the percentage of the read workload for a node should be in the target range and the percentage of the write workload for the node should be in the target range). In at least one embodiment, the load balancing algorithm may generate one or more solutions in the step S15, where each solution is a list of LUN movements between the nodes. From the step S15, processing may proceed to the step S16 of the trigger phase 404.

At the step S16, the one or more solutions generated by the load balancing algorithm may be saved, for example, such as to non-volatile storage. From the step S16, control proceeds to the step S17 of the trigger phase 404. At the step S17, processing may be performed to determine the one or more LUN movements to be performed and the expected or predicted resulting state of the system. The expected state may include the expected or predicted I/O workloads of the nodes after the one or more LUN movements are implemented. The expected I/O workload may be based on the expected shift in I/O workload in accordance with the LUN movements. For example, assume LUN V1 having write I/O workload W1 and read I/O workload R1 is moved from very busy node A to idle node B. After the movement, the overall read workload of node A may be expected to decrease by R1 and the write workload of node A may be expected to decrease by W1. Additionally, the read workload of node B is expected to accordingly increase by R1 and the write workload of node B is expected to accordingly increase by W1.

From the step S17 of the trigger phase 404, processing proceeds 401b to the action phase 406. The action phase 406 includes a step S21 that implements the one or more LUN movements determined in the step S17 of the trigger phase 404. In at least one embodiment, the step S21 may include moving the LUNs in stages where all LUN movements from node A to node B may be performed first and all remaining LUN movements from node B to node A may be performed. In at least one embodiment, processing may be performed in the step S21 to initially move LUNs out of the busier node to the less busy peer node.

The movement of LUNs between the nodes of the system in the step S21 may be logical or physical movement of the LUNs. In at least one embodiment, if LUN movements are between nodes configured with dynamic ALUA, LUN movement may use dynamic ALUA by changing preferred or optimized paths or volume affinities without actually migrating the LUNs.

If the LUN movements are between nodes not configured using dynamic ALUA, another technique may be used to implement the LUN movements between the nodes in connection with load balancing. For example, both nodes may be able or capable of servicing I/Os to the same set of LUNs. However, for each LUN, one of the nodes may be assigned as the primary node handling I/O s for the LUN with the other peer node as the secondary node that takes over I/O handling for the LUN if the primary node fails. In such an embodiment, either node may receive an I/O for the LUN. If the receiving node is not the primary for the LUN, the I/O may be forwarded internally within the appliance to the primary peer node for servicing. Any data or other return information may be returned through the receiving node.

If the load balancing techniques described herein are applied to two appliances or data storage systems, LUNs may be physically moved or migrated from one appliance or system to another. In this case, the LUN movement is implemented by actual migration of the LUN and its data from one appliance or system to the other.

In at least one embodiment when moving LUNs among nodes by changing the preferred or optimized path settings using dynamic ALUA, LUNs may be moved in an aggregated manner. In a first phase, processing may be performed to first move LUNs from a busier node to its less busy peer, and then move LUNs from the less busy peer to the busier node. The foregoing movements may include moving all LUNs identified in the step S17.

In at least one embodiment, the list of LUN movements to be implemented as determined in the step S17 may be partitioned and moved in portions. After moving each portion or subset of the LUN movements, processing may be performed to re-evaluate the current I/O workloads of the nodes. It may be, for example, that the I/O workloads of the nodes may be considered balanced and brought within the target range [q, 1-q] without requiring movement of all LUNs identified on the list. Following the step S21, the step S22 of the action phase 406 may be performed.

In the step S22 of the action phase 406, processing may be performed to verify that new subsequent I/Os directed to the LUNs that have been moved in the step S21 are now being transmitted over the correct path(s) to the expected nodes.

Following the step S22, control proceeds 401c from the action phase 406 to the validate and log phase 408. The validate and log phase 408 may include a step S31 to wait an amount of time for the transition effects of the implemented LUN movements to subside. For example, the step S31 may wait 30 seconds or some other specified amount of time). In this manner, the nodes may be given time to transition to their new I/O workloads as a result of the LUN movements implemented in the action phase 406. After the 30 seconds or other time period has elapsed, control proceeds from the step S31 to the step S32 of the validate and log phase 408.

At the step S32, processing may be performed evaluate the result of the LUN movements The step S32 may include determining the current I/O workloads of the nodes, in normalized read units and write units, to determine whether the current I/O workloads are within the specified target ranges. In at least one embodiment, the step S32 may include determining whether the current normalized read workload for each node is within the read target range (e.g., [q, 1−q]), and whether the current normalized write workload for each node is within the write target range. From the step S32, control proceeds to the step S33 of the validate and log phase 408. In the step S33, processing may be performed to log any relevant data to enable any desired analysis or debugging.

After the step S33 of the validate and log phase 408 is completed, control proceeds 401d to the monitor phase 402 to await processing performed after the next time period p has elapsed.

Following is a more detailed example applying use of the techniques herein in connection with performing load balancing between nodes configured with dynamic ALUA.

Figure 5A:
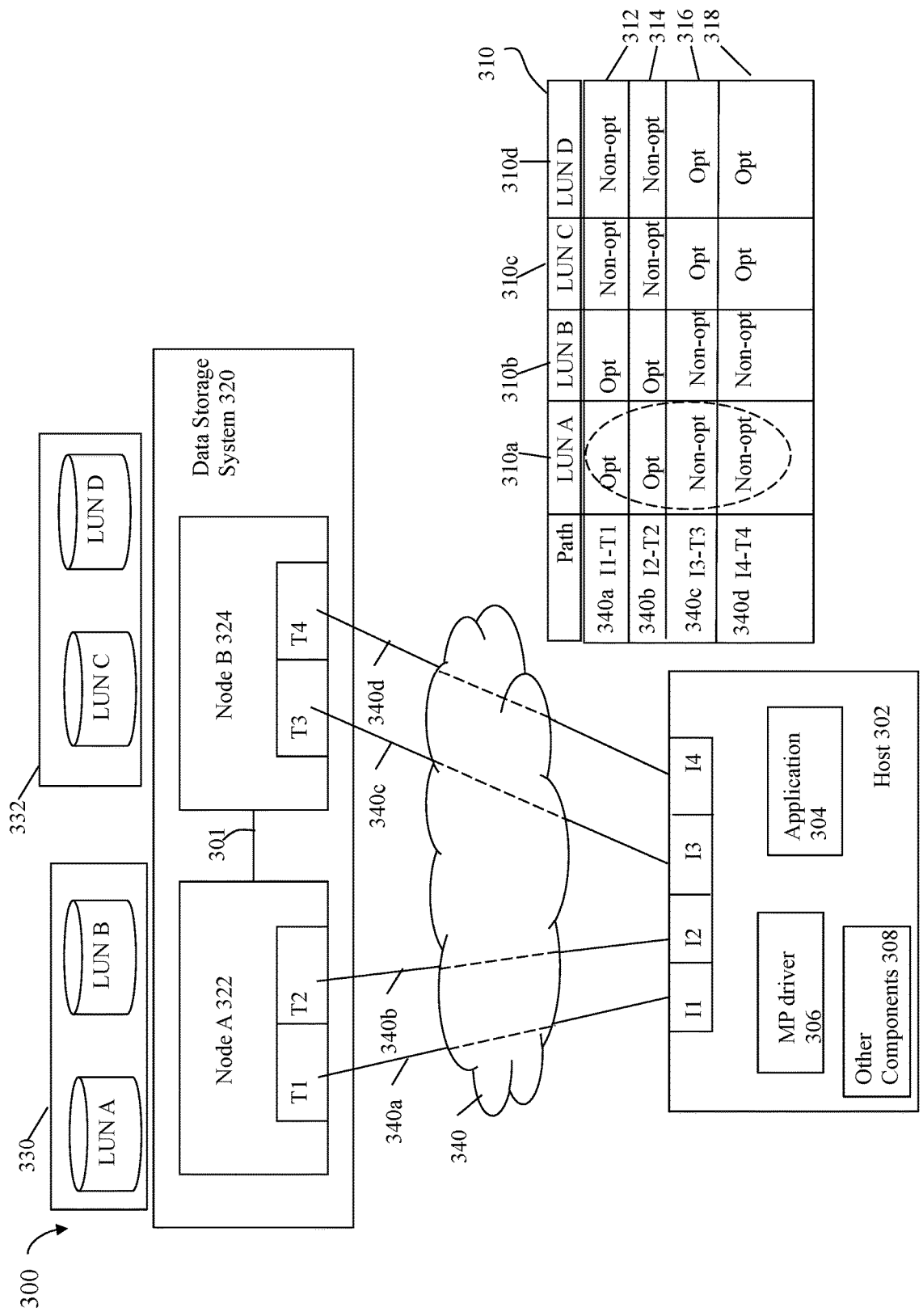
FIGS. 5A and 5B are examples illustrating use of the techniques herein to rebalance workload among the nodes of the data storage system in an embodiment in accordance with the techniques herein.

Referring to FIG. 5A, shown is an example of an embodiment of a system that may be utilized in connection with the techniques herein. The example 300 includes a host 302, a network 340 and a data storage system 320. The host 302 and data storage system 320 may communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNS of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The MP driver 306 may be included in a commercially available product such as, for example, Dell® EMC PowerPath® software by Dell Inc. The host 302 may also include other components 308 such as one or more other layers of software used in connection with communicating the I/O operation from the host to the data storage system 120. For example, element 108 may include Fibre Channel (FC) and SCSI drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs as described above. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 106 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340*a-d*. As described in more detail below, each of the paths 340*a-d* may have an associated ALUA state also used by the host when issuing I/O operations. Each path 340*a-d* may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) may be then mapped to data operations directed to LUNs of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/O s issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/O s directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states.

In accordance with the techniques herein, the data storage system may set the path state for a particular LUN to preferred or non-preferred in connection with processing performed to load balance or rebalance I/O workload of the LUNs among the nodes. Thus, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which I/Os may be issued to the LUN. Use of such access state changes in connection with the techniques herein is described in more detail below.

The elements 330 and 332 may denote the initial partitioning or assignment of the 4 LUNs A, B, C and D among the nodes A and B at a first point in time. In this example, the element 330 indicates that the LUN A and the LUN B are initially assigned to node A 322 whereby the paths 340*a-b* to the target ports T1 and T2 of node A 322 are set to preferred or optimized for the LUNs A and B and set to non-optimized or non-preferred for the remaining LUNs C and D. The element 332 indicates that the LUN C and the LUN D are initially assigned to node B 324 whereby the paths 340c-d to the target ports T3 and T4 of node B 324 are set to optimized or preferred for the LUNs C and D and set to non-optimized or non-preferred for the remaining LUNs A and B.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B C and D. The table 310 reflects the path states after the initial partitioning or assignment of LUNs to the nodes 322, 324 as denoted, respectively, by the sets 330, 332. The row 312 indicates that path I1-T1 including the target port T1 of node A 322 is optimized (opt) or preferred for the LUNs A and B and non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

At the first point in time when the initial partitioning of the LUNs among the two nodes 322, 324 is performed, assume that a first I/O workload of the node 322 and a second I/O workload of the node 324 are about the same within a specified tolerance so there is no workload imbalance. In particular, assume that the aggregated I/O workload of LUNs A and B is approximately the same as the aggregated I/O workload of LUNs C and D.

The I/O workload of the nodes 322, 324 may be monitored periodically, such as described in connection with the monitoring phase 402 of FIG. 4, to determine whether the one or more trigger conditions described elsewhere herein are met and thereby triggering load rebalancing between the nodes 322, 324 (e.g., wherein such rebalancing may be performed in connection with the phases 404 and 406 of FIG. 4). Assume at a second point in time subsequent to the first point in time, the I/O workloads of the nodes 322, 324 may be measured, normalized, and determined to meet the trigger conditions as described in connection with the monitoring phase 402. For example, at the second point in time, the normalized I/O workloads directed to the LUNs A and B, and thus to the node A 322, may become very active or heavy. In contrast, at the second point in time, the normalized I/O workloads directed to the LUNs C and D, and thus to node B 324, may be very low or inactive.

Thus, at the second point in time, load rebalancing of the workload of the LUNs among the nodes may be triggered. Continuing with this example, assume that the load rebalancing performed includes shifting the I/O workload of one or more LUNs from the busy node A to the inactive or lower activity node B. Thus load rebalancing includes selecting one or more LUNs having preferred paths 340a-b to the busy node A and non-preferred paths 340c-d to node B, setting the paths 340a-b for the one or more LUNs to the busy node A to non-preferred, and setting the paths 340c-d for the one or more LUNs to the lower activity node B to preferred. The columns 310a-b of the table 310 denote the path settings, respectively, for the LUNs A and B of the set 330. The columns 310c-d of the table 310 denote the path settings, respectively, for the LUNs A and B of the set 330.

Figure 5B:
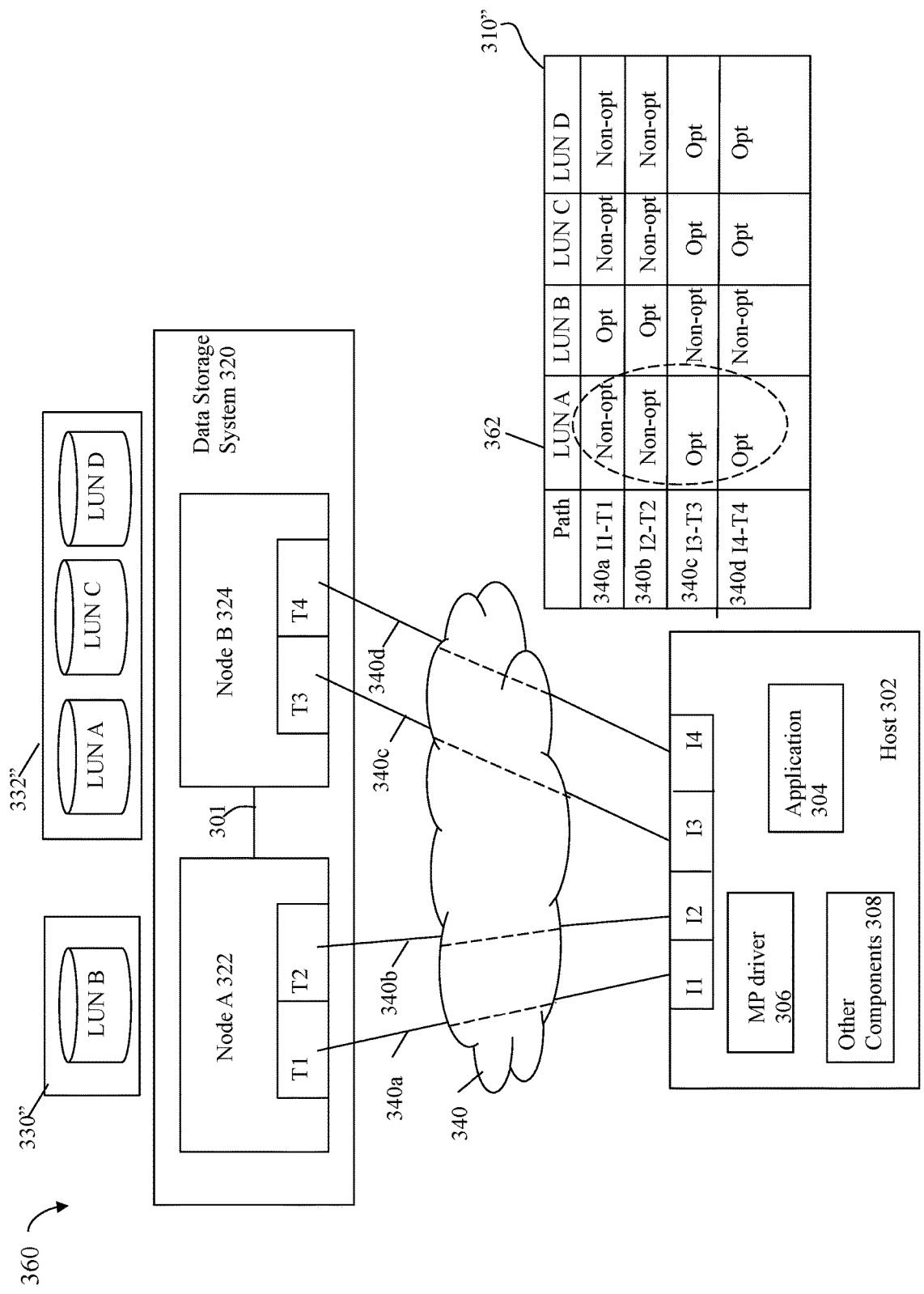

In one aspect, the LUNs of the set 330 having preferred paths 340a-b to the node A 322 and non-preferred paths 340c-d to the node B 324 may be characterized as candidates from which the one or more LUNs are selected for having their workload shifted from the node A 322 to the node B 324. Thus the load rebalancing in this example includes selecting one of the LUNs A and B from set 330. Any suitable criteria may be used to select one or more LUNs from the set of candidate LUNs 330. For example, one or more I/O workload metrics may be collected for each of the LUNs 330 and the candidate LUNs may be ranked, from highest I/O workload to lowest I/O workload, based on the one or more I/O workload metrics. The I/O workload metric used may be, for example, an I/O rate for the LUN such as I/O s per second (IOPS). Assume that LUN A has a higher I/O rate than LUN B. In this case, LUN A may be selected to have its workload shifted from the busy node A to the lower activity node B. In accordance with the techniques herein, the load rebalancing may include modifying the path states of the column 310a of the table 310 of the table 310 for the selected LUN A to have values as denoted by the columns 362 of the table 310" of the FIG. 5B. The FIG. 5B includes similarly numbered components as in the FIG. 5A with the following differences:

1. the table 310 of FIG. 5A is updated as a result of load rebalancing to have the values as in the table 310" of the FIG. 5B. In particular, the table 310 of FIG. 5A and the table 310" of FIG. 5B differ only in that the column 310a of the FIG. 5A is updated by load rebalancing to have the updated values as denoted by the column 362 of the FIG. 3B. The column 362 indicates that the path states for LUN A have been updated to specify the paths 340a-b to the node A 322 as non-preferred or non-optimized (non-opt) and the paths 340c-d to the node B 324 as preferred or optimized (opt).

2. the LUN sets 330, 332 of FIG. 5A are updated as a result of load rebalancing to the LUN sets 330", 332" of FIG. 5B as a result of load rebalancing. In particular the LUN sets 330", 332" indicate that the LUN A has been moved or reassigned by load rebalancing to the node B as its preferred node whereby the paths 340c-d to node B transition from the non-preferred to the preferred state for the LUN A, and the paths 340a-b to node A transition from the preferred state to the non-preferred state for the LUN A.

Responsive to the data storage system updating the table 310 of FIG. 5A to have the values as in the table 310" of the FIG. 5B, the data storage system may notify the host regarding the path state changes and the updated path states as illustrated by the column 362. Based on the information in the column 362, the host may subsequently send I/O s to the LUN A using the preferred paths 340c-d rather than the non-preferred path 340a-b. In at least one embodiment, the MP driver 306 of the host 302 may use the information of the received notification identifying the state changes of the column 362. The host 302 may send I/O s to a LUN over the paths identified as preferred or optimized for the LUN. The host may always send I/Os using only the optimized or preferred paths. If there are no active optimized or preferred paths for the LUN, the host may then utilized one of the active non-preferred or non-optimized paths for the LUN. Thus, the path state modifications as illustrated by the column 362 effectively shift or move subsequent I/O workload of the LUN A from the node 322 to the node 324.

At a third point in time subsequent to the second point in time, the workloads of the nodes 322, 324 may once again be measured and evaluated to determine whether the specified trigger conditions are true and thereby trigger load balancing to shift the workload of one or more LUNs from a busy node to a non-busy node. In connection with the techniques herein in an embodiment using dynamic ALUA, the workload shift may be accomplished by modifying the preferred and non-preferred paths states for the one or more selected LUNs having their workload shifted from the busy node to the non-busy node.

Although the foregoing example of FIGS. 5A and 5B illustrates only a single host and a single data storage system for simplicity of illustration, more generally the techniques described herein may be used in an embodiment having any number of data storage systems and any number of hosts or other clients and any suitable number of paths.

As described above, an imbalance with respect to the workload of the nodes may be determined in accordance with one or more criteria or trigger conditions. If one or more of the criteria or trigger conditions is met, an imbalance in workload of the nodes may be determined resulting in performing processing to rebalance the workload of the nodes. Such rebalancing of the workload may include dynamically modifying the particular paths that are designated as preferred or optimized paths for one or more LUNs to shift the I/O workload of such LUNs from a first node that is very busy or saturated to a second node that is less busy with a less workload. A first node may have a first group of one or more target ports over which a first LUN group of LUNs are exposed on a first group of paths designated as optimized or preferred paths. A second node may have a second group of one or more target ports over which the first LUN group of LUNs are exposed on a second group of paths designated as non-optimized or non-preferred paths. If the first node is determined as overloaded and having a higher workload than the second node, processing may be performed to rebalance the workloads of the nodes. The processing may include modifying the path state for the first group of paths for one or more LUNs of the first LUN group from optimized or preferred to non-optimized or non-preferred, and modifying the path state for the second group of paths for one or more LUNs of the first LUN group from non-optimized or non-preferred to optimized or preferred, thereby moving I/O workload from the first node to the second node where the second node is now preferred for servicing I/Os of the one or more LUNs.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing load balancing comprising:
   receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device;
   determining normalized I/O workloads corresponding to the I/O workloads of the storage server entities;
   determining, in accordance with utilization criteria, imbalance criteria and the normalized I/O workloads, whether to rebalance the I/O workloads of the storage server entities; and
   responsive to determining to rebalance the I/O workloads of the storage server entities, performing first processing to alleviate a detected I/O workload imbalance between a first of the storage server entities and a second of the storage server entities, the first processing including:
      moving a first of the plurality of logical devices from a first of the storage server entities to a second of the storage server entities; and
      transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device, wherein said determining normalized I/O workloads corresponding to the I/O workloads of the storage server entities includes:
   determining, for each of the storage server entities, a normalized read I/O workload in normalized read units and a normalized write I/O workload in normalized write units, wherein said determining the normalized read I/O workload of said each storage server entity includes determining a first normalized read I/O rate for a corresponding read I/O rate for read I/Os of a first size, and wherein the first normalized read I/O rate is determined by performing second processing comprising:
   selecting a coefficient in accordance with a read I/O type and a configuration of a system in which the corresponding read I/O workload associated with the normalized read I/O workload is processed; and
   determining the first normalized read I/O rate for the corresponding read I/O rate for read I/Os of the first size as a mathematical product of the corresponding read I/O rate and a first quantity that is raised to a power denoted by the coefficient, wherein the first quantity is determined by dividing the first size by a base size used to scale the corresponding read I/O rate.

2. The method of claim 1, wherein said moving and said transferring ownership shifts a first I/O workload of the first logical device from the first storage server entity to the second storage server entity, wherein a load balancing technique is used to select the first logical device and the first I/O workload to be moved from the first storage server entity to the second storage server entity, and wherein the load balancing technique performs processing using normalized I/O workloads of the plurality of logical devices to select the first logical device for movement from the first storage server entity to the second storage server entity.

3. The method of claim 1, wherein said determining whether to rebalance the I/O workloads of the storage server entities comprises determining whether the utilization criteria and the imbalance criteria are met.

4. The method of claim 3, wherein the utilization criteria specifies that a utilization of at least one of the first storage server entity and the second storage server entity needs to exceed a specified threshold utilization in order to perform said first processing.

5. The method of claim 3, wherein the imbalance criteria specifies that a difference or gap between a first normalized I/O workload of the first storage server entity and a second normalized I/O workload of the second storage entity needs to exceed a specified threshold in order for the first storage server entity and the second storage server entities to have imbalanced workloads and in order to perform said first processing.

6. The method of claim 1, wherein the storage server entities include at least two data storage systems configured in a cluster or federation, and wherein the first storage server entity is a first of the at least two data storage systems and the second storage server entity is a second of the at least two data storage systems.

7. The method of claim 6, wherein said moving the first logical device includes migrating or relocating the first logical device from the first data storage system to the second data storage system.

8. The method of claim 1, wherein the storage server entities include at least two nodes included in a data storage system and wherein the first storage server entity is a first of the at least two nodes and the second storage server entity is a second of the at least nodes.

9. The method of claim 8, wherein said moving the first logical device includes dynamically changing one or more preferred paths for the first logical device from the first node to the second node, wherein each of the preferred paths after said moving is from a host to a target port of the second node of the data storage system, and wherein, prior to said moving, each of the preferred paths is from the host to another target port of the first node of the data storage system.

10. The method of claim 9, further comprising:
sending a notification from the data storage system to the host, wherein the notification identifies a change in the one or more preferred paths for the first logical device from the first node to the second node;
receiving the notification at the host;
sending I/Os to the first logical device over the one or more preferred paths; and
responsive to determining the one or more preferred paths are not available for I/O transmission, sending subsequent I/Os to the first logical device over one or more non-preferred paths from the host to the first node of the data storage system.

11. A method of performing load balancing comprising:
receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device;
determining normalized I/O workloads corresponding to the I/O workloads of the storage server entities;
determining, in accordance with utilization criteria, imbalance criteria and the normalized I/O workloads, whether to rebalance the I/O workloads of the storage server entities; and
responsive to determining to rebalance the I/O workloads of the storage server entities, performing first processing to alleviate a detected I/O workload imbalance between a first of the storage server entities and a second of the storage server entities, the first processing including:
moving a first of the plurality of logical devices from a first of the storage server entities to a second of the storage server entities; and
transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device, wherein said determining normalized I/O workloads corresponding to the I/O workloads of the storage server entities includes:
determining, for each of the storage server entities, a normalized read I/O workload in normalized read units and a normalized write I/O workload in normalized write units, wherein said determining the normalized write I/O workload of said each storage server entity includes determining a first normalized write I/O rate for a corresponding write I/O rate for write I/Os of a first size, and wherein the first normalized write I/O rate is determined by performing second processing comprising:
selecting a coefficient in accordance with a write I/O type and a configuration of a system in which the corresponding write I/O workload associated with the normalized write I/O workload is processed; and
determining the first normalized write I/O rate for the corresponding write I/O rate for write I/Os of the first size as a mathematical product of the corresponding write I/O rate and a first quantity that is raised to a power denoted by the coefficient, wherein the first quantity is determined by dividing the first size by a base size used to scale the corresponding write I/O rate.

12. A non-transitory computer readable medium comprising code stored thereon, that, when executed, performs a method of load balancing comprising:
receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device;

determining normalized I/O workloads corresponding to the I/O workloads of the storage server entities;

determining, in accordance with utilization criteria, imbalance criteria and the normalized I/O workloads, whether to rebalance the I/O workloads of the storage server entities; and responsive to determining to rebalance the I/O workloads of the storage server entities, performing first processing to alleviate a detected I/O workload imbalance between a first of the storage server entities and a second of the storage server entities, the first processing including:

moving a first of the plurality of logical devices from a first of the storage server entities to a second of the storage server entities; and transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device, wherein said determining normalized I/O workloads corresponding to the I/O workloads of the storage server entities includes:

determining, for each of the storage server entities, a normalized read I/O workload in normalized read units and a normalized write I/O workload in normalized write units, wherein said determining the normalized read I/O workload of said each storage server entity includes determining a first normalized read I/O rate for a corresponding read I/O rate for read I/Os of a first size, and wherein the first normalized read I/O rate is determined by performing second processing comprising:

selecting a coefficient in accordance with a read I/O type and a configuration of a system in which the corresponding read I/O workload associated with the normalized read I/O workload is processed; and determining the first normalized read I/O rate for the corresponding read I/O rate for read I/Os of the first size as a mathematical product of the corresponding read I/O rate and a first quantity that is raised to a power denoted by the coefficient, wherein the first quantity is determined by dividing the first size by a base size used to scale the corresponding read I/O rate.

13. A system comprising:
one or more processors; and
a memory comprising code stored thereon that, when executed, performs a method load balancing comprising:

receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device;

determining normalized I/O workloads corresponding to the I/O workloads of the storage server entities;

determining, in accordance with utilization criteria, imbalance criteria and the normalized I/O workloads, whether to rebalance the I/O workloads of the storage server entities; and responsive to determining to rebalance the I/O workloads of the storage server entities, performing first processing to alleviate a detected I/O workload imbalance between a first of the storage server entities and a second of the storage server entities, the first processing including:

moving a first of the plurality of logical devices from a first of the storage server entities to a second of the storage server entities; and transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device, wherein said determining normalized I/O workloads corresponding to the I/O workloads of the storage server entities includes:

determining, for each of the storage server entities, a normalized read I/O workload in normalized read units and a normalized write I/O workload in normalized write units, wherein said determining the normalized read I/O workload of said each storage server entity includes determining a first normalized read I/O rate for a corresponding read I/O rate for read I/Os of a first size, and wherein the first normalized read I/O rate is determined by performing second processing comprising:

selecting a coefficient in accordance with a read I/O type and a configuration of a system in which the corresponding read I/O workload associated with the normalized read I/O workload is processed; and determining the first normalized read I/O rate for the corresponding read I/O rate for read I/Os of the first size as a mathematical product of the corresponding read I/O rate and a first quantity that is raised to a power denoted by the coefficient, wherein the first quantity is determined by dividing the first size by a base size used to scale the corresponding read I/O rate.

14. A non-transitory computer readable medium comprising code stored thereon that, when executed, performs a method of load balancing comprising:

receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device;

determining normalized I/O workloads corresponding to the I/O workloads of the storage server entities;

determining, in accordance with utilization criteria, imbalance criteria and the normalized I/O workloads, whether to rebalance the I/O workloads of the storage server entities; and responsive to determining to rebalance the I/O workloads of the storage server entities, performing first processing to alleviate a detected I/O workload imbalance between a first of the storage server entities and a second of the storage server entities, the first processing including:

moving a first of the plurality of logical devices from a first of the storage server entities to a second of the storage server entities; and transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device, wherein said determining normalized I/O workloads corresponding to the I/O workloads of the storage server entities includes:

determining, for each of the storage server entities, a normalized read I/O workload in normalized read units and a normalized write I/O workload in normalized write units, wherein said determining the normalized write I/O workload of said each storage server entity includes determining a first normalized write I/O rate for a corresponding write I/O rate for write I/Os of a first size, and wherein the first normalized write I/O rate is determined by performing second processing comprising:

selecting a coefficient in accordance with a write I/O type and a configuration of a system in which the corresponding write I/O workload associated with the normalized write I/O workload is processed; and determining the first normalized write I/O rate for the corresponding write I/O rate for write I/Os of the first size as a mathematical product of the corresponding write I/O rate and a first quantity that is raised to a power denoted by the coefficient, wherein the first quantity is determined by dividing the first size by a base size used to scale the corresponding write I/O rate.

15. A system comprising:
one or more processors; and
a memory comprising code stored thereon that, when executed, performs a method of load balancing comprising:
  receiving I/O workloads of storage server entities, wherein the storage server entities service a plurality of I/O operations received in connection with a plurality of logical devices, wherein each of the plurality of logical devices has a designated owner that is one of the storage server entities and wherein the designated owner processes I/O operations directed to said each logical device;
  determining normalized I/O workloads corresponding to the I/O workloads of the storage server entities;
  determining, in accordance with utilization criteria, imbalance criteria and the normalized I/O workloads, whether to rebalance the I/O workloads of the storage server entities; and responsive to determining to rebalance the I/O workloads of the storage server entities, performing first processing to alleviate a detected I/O workload imbalance between a first of the storage server entities and a second of the storage server entities, the first processing including:
    moving a first of the plurality of logical devices from a first of the storage server entities to a second of the storage server entities; and
    transferring ownership of the first logical device from the first storage server entity to the second storage server entity, wherein before said moving, the first storage server entity is the designated owner of the first logical device, and after said moving, the second storage server entity is the designated owner of the first logical device and processes I/O operations directed to the first logical device, wherein said determining normalized I/O workloads corresponding to the I/O workloads of the storage server entities includes:
  determining, for each of the storage server entities, a normalized read I/O workload in normalized read units and a normalized write I/O workload in normalized write units, wherein said determining the normalized write I/O workload of said each storage server entity includes determining a first normalized write I/O rate for a corresponding write I/O rate for write I/Os of a first size, and wherein the first normalized write I/O rate is determined by performing second processing comprising:
  selecting a coefficient in accordance with a write I/O type and a configuration of a system in which the corresponding write I/O workload associated with the normalized write I/O workload is processed; and
  determining the first normalized write I/O rate for the corresponding write I/O rate for write I/Os of the first size as a mathematical product of the corresponding write I/O rate and a first quantity that is raised to a power denoted by the coefficient, wherein the first quantity is determined by dividing the first size by a base size used to scale the corresponding write I/O rate.

16. The method of claim 1, wherein the utilization criteria includes an overall utilization with respect to the storage server entities, wherein the overall utilization is defined as a ratio or a percentage of an aggregated number of I/Os collectively performed by the storage server entities in a defined period of time with respect to a maximum aggregated number of I/Os the storage server entities are capable of collectively performing within the defined period of time, and wherein the utilization criteria further specifies that the overall utilization denoted by the ratio or percentage needs to exceed a first threshold in order to perform said first processing.

* * * * *